US008838639B2

(12) United States Patent
Sekiguchi et al.

(10) Patent No.: US 8,838,639 B2
(45) Date of Patent: Sep. 16, 2014

(54) MANAGEMENT DEVICE AND MANAGEMENT METHOD FOR MANAGING CONSTITUENT ELEMENTS OF AN INFORMATION TECHNOLOGY SYSTEM

(75) Inventors: Atsuji Sekiguchi, Kawasaki (JP); Yuji Wada, Kawasaki (JP); Masataka Sonoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 35 days.

(21) Appl. No.: 12/926,978

(22) Filed: Dec. 21, 2010

(65) Prior Publication Data

US 2011/0161353 A1   Jun. 30, 2011

(30) Foreign Application Priority Data

Dec. 28, 2009   (JP) .................................. 2009-298878

(51) Int. Cl.
  *G06F 17/30* (2006.01)
  *H04L 12/24* (2006.01)
(52) U.S. Cl.
  CPC .................................. H04L 41/0866 (2013.01)
  USPC ........................................................ 707/769
(58) Field of Classification Search
  USPC ....................................................... 707/999.2
  See application file for complete search history.

(56) References Cited

U.S. PATENT DOCUMENTS

| 7,761,530 B2 * | 7/2010 | Cain et al. ..................... 709/213 |
| 8,051,028 B2 | 11/2011 | Karnik et al. |
| 8,285,742 B2 | 10/2012 | Wada et al. |
| 8,311,977 B2 | 11/2012 | Wada et al. |
| 2003/0066000 A1 | 4/2003 | Shigeta |
| 2007/0100892 A1 * | 5/2007 | Kephart et al. ............... 707/200 |

FOREIGN PATENT DOCUMENTS

| JP | 2003-028935 | 1/2003 |
| JP | 2009-048611 | 3/2009 |
| JP | 2009-217455 | 9/2009 |
| WO | WO 2009/150742 | 12/2009 |

OTHER PUBLICATIONS

Japanese Office Action, Mailed Sep. 10, 2013; In correspondence to Japanese Patent Application No. 2009-298818.
Japanese Office Action, Mailed Sep. 10, 2013; In correspondence to Japanese Patent Application No. 2009-298878.

* cited by examiner

*Primary Examiner* — Rehana Perveen
*Assistant Examiner* — Hung Havan
(74) *Attorney, Agent, or Firm* — Staas & Halsey LLP

(57) ABSTRACT

A management device includes a memory unit for storing configuration item information regarding configuration items to be managed and relationship information regarding relationships between the configuration items to be managed, an extracting unit for extracting, based on the information stored in the memory unit and based on predetermined constraint conditions, such relationships between the configuration items that satisfy the predetermined constraint conditions and that are not included in the relationship information, and an evaluating unit for executing an application that refers to the extracted relationships between the configuration items and obtains an evaluation result regarding the extracted relationships between the configuration items.

6 Claims, 25 Drawing Sheets

FIG.4

| TYPE CONSTRAINT | | |
|---|---|---|
| CONSTRAINT NAME | SOURCE TYPE | TARGET TYPE |
| pm-vm | PM | VM |
| vm-pm | VM | PM |

| NUMBER CONSTRAINT | | |
|---|---|---|
| CONSTRAINT NAME | SOURCE NUMBER | TARGET NUMBER |
| pm-vm | 1 | 0 OR MORE |
| vm-pm | 1 | 1 |

| STATE TRANSITION CONSTRAINT | | |
|---|---|---|
| CONSTRAINT NAME | SOURCE STATE | TARGET STATE |
| pm-vm down | down | down |

| INTER-RELATIONSHIP CONSTRAINT | | |
|---|---|---|
| CONSTRAINT NAME | CONDITION | CONSTRAINT |
| pm-vm pair | $\forall$ pm1, vm1 pm-vm: pm1→vm1 | $\exists$ vm-pm: vm1→pm1 |

FIG.9

| PROSPECTIVE RELATIONSHIP | SOURCE | TARGET | GRADE |
|---|---|---|---|
| r1 | vb01 | pm11 | 1 |
| r2 | pm11 | vb01 | 1 |

| NO. | ERROR-CAUSING CI | ERROR-OCCURRING CI |
|---|---|---|
| 1 | pm11 | pm11, va01, vb01, Ta, Tb |
| 2 | va02 | va02, Ta, Tc |
| ... | ... | ... |

| PROSPECTIVE RELATIONSHIP | SOURCE | TARGET |
|---|---|---|
| r1 | vb01 | pm11 |
| r2 | pm11 | vb01 |
| ... | ... | ... |

MANAGEMENT DEVICE AND MANAGEMENT METHOD FOR MANAGING CONSTITUENT ELEMENTS OF AN INFORMATION TECHNOLOGY SYSTEM

CROSS-REFERENCE TO RELATED APPLICATION(S)

This application is based upon and claims the benefit of priority of the prior Japanese Patent Application No. 2009-298878, filed on Dec. 28, 2009, the entire contents of which are incorporated herein by reference.

FIELD

The embodiments discussed herein are directed to a management device and a management method.

BACKGROUND

The concept of a configuration management database (CMDB) has been known for some time. According to a document known as the information technology infrastructure library (ITIL), a CMDB is defined as a database for managing an information technology (IT) system. Meanwhile, the ITIL is a guidebook proposed by British Commerce Department.

More particularly, in a CMDB is stored the information regarding configuration items (CIs) representing constituent elements of an IT system and the information regarding relationships between the CIs.

Explained below with reference to FIG. 27 is an example of a CMDB for managing the CIs constituting an IT system. FIG. 27 is an explanatory diagram for explaining a CMDB. As illustrated in FIG. 27, the CMDB stores therein CIs representing physical machines "PM: pm11" to "PM: pm13" and CIs representing virtual machines "VM: va01" to "VM: va03" and "VM: vb01" to "VM: vb03". In addition, the CMDB stores therein CIs representing services "Svc: Ta" to "Svc: Tc" that are provided by the virtual machines. Besides, the CMDB also stores therein relationships from "01. vm-pm" to "20. vm-tenant" that represent the relationships between the abovementioned CIs.

For example, with reference to FIG. 27, the relationship "01. vm-pm" and the relationship "02. pm-vm" represent the relationships between the physical machine "PM: pm11" and the virtual machine "VM: va01". Similarly, the relationship "13. vm-tenant" represents the relationship between the service "Svc: Ta" and the virtual machine "VM: va01". Thus, in the CMDB illustrated in FIG. 27, it is specified that the virtual machine "VM: va01" is mounted on the physical machine "PM: pm11", while the service "Svc: Ta" is provided by the virtual machine "VM: va01".

In such a CMDB, if some relationships remain undefined, then an application that refers to the relationships may not be able to obtain proper results. Explained below is a case when, as an application referring to the relationships, an application that traces the CIs in which errors have occurred with the aim of uniquely identifying the CIs that have caused errors is not able to obtain proper results.

The case when the abovementioned application is unable to obtain proper results is explained with reference to FIG. 28. FIG. 28 is an explanatory diagram for explaining undefined relationships in the CMDB. In the example illustrated in FIG. 28, it is assumed that the occurrence of an error in the physical machine "PM: pm11" leads to the occurrence of an error in each of the virtual machine "VM: va01", the virtual machine "VM: vb01", the service "Svc: Ta", the service "Svc: Tb", and the service "Svc: Tc". In addition, it is assumed that the relationship "03. pm-vm" and the relationship "04. vm-pm" representing the relationships between the physical machine "PM: pm11" and the virtual machine "VM: vb01" remain undefined. Meanwhile, in FIG. 28, each CI in which an error has occurred is flagged with a star sign.

Herein, for example, the application traces the relationship "16. vm-tenant" from the service "Svc: Tb" and identifies the virtual machine "VM: vb01" as the virtual machine providing the service "Svc: Tb". Subsequently, the application attempts to trace relationships from the virtual machine "VM: vb01" and to identify the physical machine on which the virtual machine "VM: vb01" is mounted.

However, in the CMDB illustrated in FIG. 28, since the relationships "03. pm-vm" and "04. vm-pm" are not defined, the application is not able to trace the relationships "03. pm-vm" and "04. vm-pm" with the aim of identifying the physical machine on which the virtual machine "VM: vb01" is mounted. That is, the application is not able to identify the physical machine that has caused an error in the virtual machine "VM: vb01" and in the service "Svc: Tb".

In this way, when an application is not able to properly trace the CIs stored in a CMDB, the user has to manually supplement the relationships in order to maintain the consistency of the CMDB. That is, in order to find out the undefined relationships, the user has to confirm whether all relationships that are supposed to be defined for each CI have actually been defined. If any relationship is found out to be undefined, then the user has to manually supplement that relationship (see, for example, Japanese Laid-open Patent Publication No. 2003-28935).

Thus, in the typical case when the user has to manually supplement the relationships; the user has to confirm whether all relationships that are supposed to be defined for each CI have actually been defined and, if any relationship is found out to be undefined, to manually supplement that relationship. Such a task requires a lot of time and efforts thereby making it difficult to supplement the undefined relationships.

SUMMARY

According to an aspect of an embodiment of the invention, a management device includes a memory unit for storing configuration item information regarding configuration items to be managed and relationship information regarding relationships between the configuration items to be managed, an extracting unit for extracting, based on the information stored in the memory unit and based on predetermined constraint conditions, such relationships between the configuration items that satisfy the predetermined constraint conditions and that are not included in the relationship information, and an evaluating unit for executing an application that refers to the extracted relationships between the configuration items and obtains an evaluation result regarding the extracted relationships between the configuration items.

According to another aspect of an embodiment of the invention, a management method includes extracting, based on information stored in a memory unit that includes configuration item information regarding configuration items to be managed and relationship information regarding relationships between the configuration items to be managed and based on predetermined constraint conditions, such relationships between the configuration items that satisfy the predetermined constraint conditions and that are not included in the relationship information, and evaluating that includes executing an application that refers to the extracted relationships between the configuration items and obtaining an evaluation result regarding the extracted relationships between the configuration items.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is an explanatory diagram for explaining examples of the constraints that are used while extracting prospective relationships;

FIG. 9 is an explanatory diagram for explaining a grade table of prospective relationships according to the second embodiment;

DESCRIPTION OF EMBODIMENTS

Preferred embodiments of the present invention will be explained with reference to accompanying drawings. The present invention is not limited to these embodiments.

[a] First Embodiment

Figure 1:
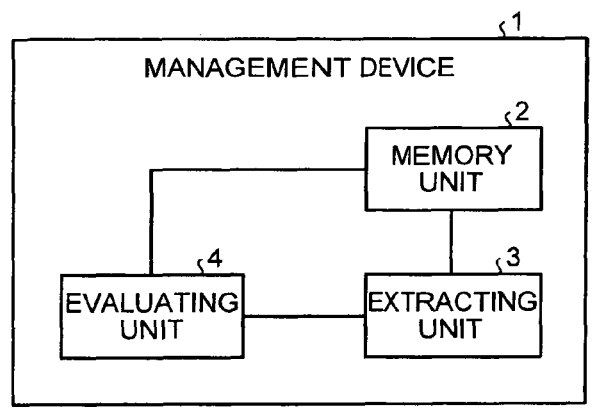
FIG. 1 is a block diagram of a management device according to a first embodiment of the present invention.

In a first embodiment of the present invention, an example of a management device is explained with reference to FIG. 1. Herein, FIG. 1 is a block diagram of the management device according to the first embodiment. The management device includes at least a CMDB and supplements the information stored in the CMDB.

As illustrated in FIG. 1, a management device 1 includes a memory unit 2, an extracting unit 3, and an evaluating unit 4. The memory unit 2 stores therein configuration item information representing the information regarding the CIs to be managed and stores therein relationship information representing the information regarding the relationships between the CIs to be managed. The extracting unit 3 extracts, based on the information stored in the memory unit 2 and based on predetermined constraint conditions, such relationships between the CIs that satisfy the predetermined constraint conditions and that are not included in the relationship information. The evaluating unit 4 executes an application referring to the extracted relationships between the CIs and obtains an evaluation result regarding the relationships between the CIs.

As described above, the management device 1 extracts such relationships between the CIs that satisfy the predetermined constraint conditions and that are not included in the relationship information. Then, the management device 1 executes an application that refers to the extracted relationships between the CIs and obtains an evaluation result regarding the relationships between the CIs. Hence, by extracting such relationships between the CIs that are not included in the relationship information and by obtaining an evaluation result regarding those relationships, it becomes possible to make use of those relationships in a supplementing operation. For example, the management device 1 can provide the user with such relationships between the configuration items that are not included in the relationship information along with an evaluation result of those relationships. That makes it easier to perform the supplementing operation.

Besides, the evaluation result obtained by the evaluating unit 4 can also be output (displayed, printed) in a corresponding manner to the relationship information. Alternatively, it can be determined whether the evaluation result satisfies predetermined criteria (criteria for proper relationships) and the relationships satisfying the criteria can be selected automatically. Still alternatively, from among the evaluated relationship information, the relationship information selected manually or automatically based on the output can be additionally registered as relationship information representing relationships between CIs.

[b] Second Embodiment

In a second embodiment of the present invention, the configuration and the sequence of operations of a supplementing device that is connected to a CMDB are explained in that order.

Figure 2:
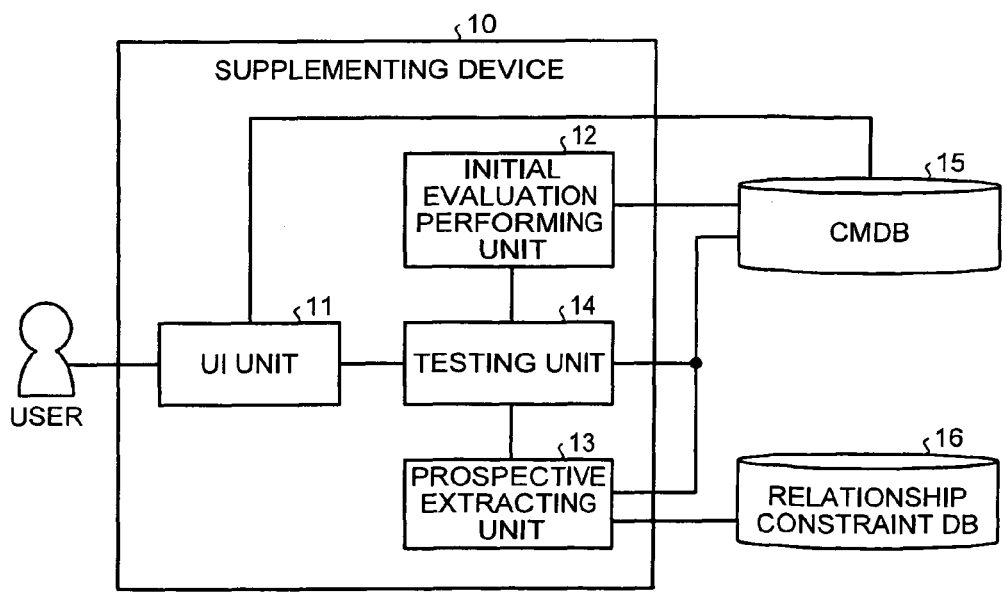
FIG. 2 is a block diagram of a supplementing device according to a second embodiment of the present invention.

Firstly, with reference to FIG. 2, a configuration of the supplementing device according to the second embodiment is explained. FIG. 2 is a block diagram of the supplementing device according to the second embodiment. As illustrated in FIG. 2, a supplementing device 10 according to the second embodiment includes a user interface (UI) unit 11, an initial evaluation performing unit 12, a prospective extracting unit 13, and a testing unit 14 (evaluating unit). Besides, the supplementing device 10 is connected to a CMDB 15 and a relationship constraint database (DB) 16.

In the CMDB 15 are stored the CIs to be managed and the relationships between the CIs to be managed. More particularly, in the CMDB 15 is stored the information regarding the CIs representing constituent elements of an IT system that is to be managed and the information regarding the relationships between those CIs.

Figure 3:
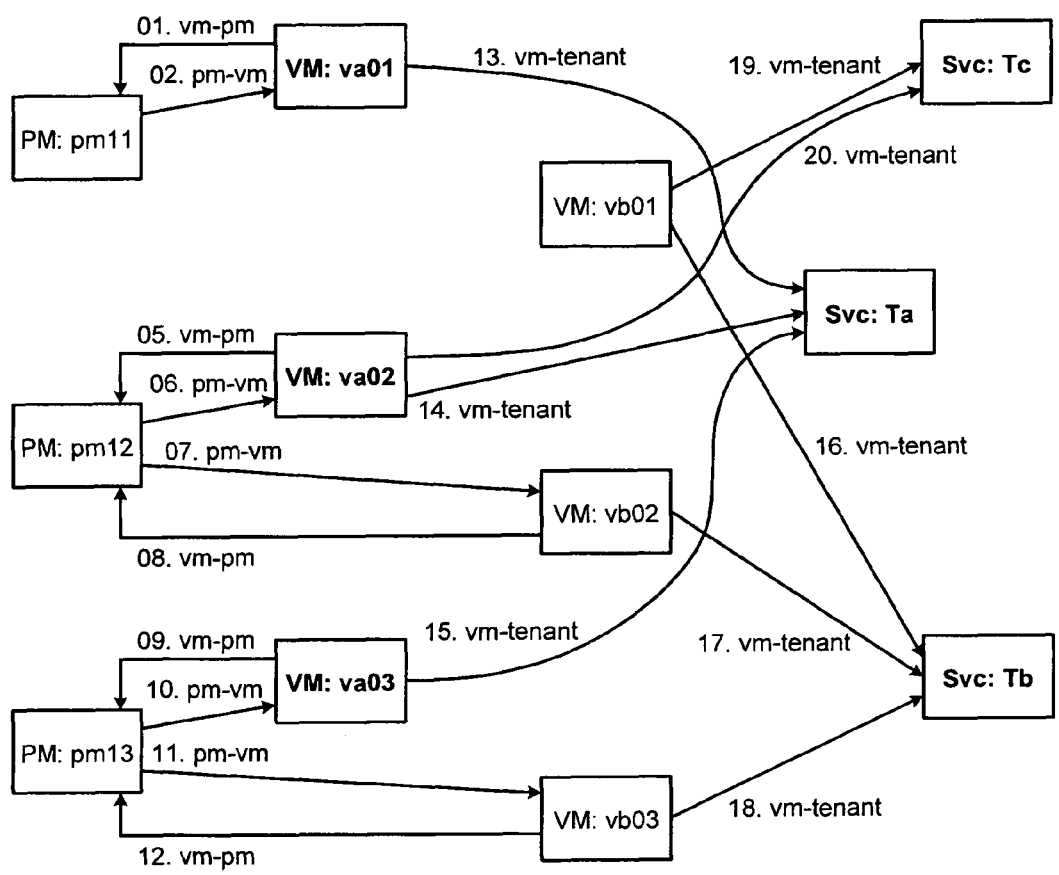
FIG. 3 is an explanatory diagram for explaining the exemplary information stored in a CMDB according to the second embodiment.

FIG. 3 is an explanatory diagram for explaining the exemplary information stored in the CMDB according to the second embodiment. As illustrated in FIG. 3, the CMDB 15 stores therein CIs representing the physical machines "PM: pm11" to "PM: pm13" and CIs representing the virtual machines "VM: va01" to "VM: va03" and "VM: vb01" to "VM: vb03". In addition, the CMDB 15 stores therein CIs representing the services "Svc: Ta" to "Svc: Tc" that are provided by the virtual machines. Besides, the CMDB also stores therein relationships from "01. vm-pm" and "02. pm-vm", and relationships from "05. vm-pm" to "20. vm-tenant" that represent the relationships between the abovementioned CIs.

Herein, it is assumed that the relationships between the physical machine "PM: pm11" and the virtual machine "VM: vb01" are not defined and therefore not stored in the CMDB 15. Moreover, it is assumed that the virtual machine "VM: vb01" is mounted on the physical machine "PM: pm11".

Returning to the explanation with reference to FIG. 2, the relationship constraint DB 16 is a database for storing predetermined constraint conditions that are used while extracting prospective relationships. More particularly, the relationship constraint DB 16 is used to store type constraints that are constraints depending on the types of CIs for which the relationships are extracted. Besides, the relationship constraint DB 16 is used to store number constraints that are constraints depending on the number of relationships set for each type of CI for which the relationships are extracted.

Moreover, the relationship constraint DB 16 is used to store state transition constraints that are constraints depending on the target states for management indicated by the CIs for which the relationships are extracted. Furthermore, the relationship constraint DB 16 is used to store inter-relationship constraints that are constraints depending on the relationships stored in the CMDB 15.

The various constraints stored in the relationship constraint DB 16 are explained below in detail with reference to FIG. 4. Thus, FIG. 4 is an explanatory diagram for explaining examples of the constraints that are used while extracting prospective relationships.

The type constraints are the constraints depending on the types of CIs for which the prospective relationships are extracted. In the example illustrated in FIG. 4, a type constraint by the constraint name of "pm-vm" indicates that a relationship of "pm-vm" format has a physical machine (PM) as the source and a virtual machine (VM) as the target. Similarly, in the example illustrated in FIG. 4, a type constraint by the constraint name of "vm-pm" indicates that a relationship of "vm-pm" format has a virtual machine (VM) as the source and a physical machine (PM) as the target.

The number constraints are the constraints indicating the number of relationships defined for each type of CI for which the prospective relationships are extracted. For example, in the example illustrated in FIG. 4, a number constraint by the constraint name of "vm-pm" indicates that at least a single relationship of "vm-pm" format is present from a single virtual machine (VM) to a single physical machine (PM). That is, the number constraint by the constraint name of "vm-pm" indicates that a virtual machine (VM) is necessarily related to a single physical machine (PM).

Similarly, a number constraint by the constraint name of "pm-vm" indicates that a relationship of "pm-vm" format is present from a single physical machine (PM) to zero or more number of virtual machines (VM). That is, the number constraint by the constraint name of "pm-vm" indicates that a physical machine (PM) may or may not be related to a virtual machine (VM).

The state transition constraints are the constraints depending on the states of the CIs for which the prospective relationships are extracted. For example, in the example illustrated in FIG. 4, a state transition constraint "pm-vm down" indicates that a virtual machine that is connected to a physical machine in a "down" state by the relationship of "pm-vm" format also needs to be in the "down" state.

Herein, the "down" state represents a state in which a CI is not able to perform operations because of an error that has occurred therein. Thus, the state transition constraint "pm-vm down" indicates that the occurrence of an error in a physical machine leads to the occurrence of an error in a virtual machine mounted on that physical machine.

The inter-relationship constraints are the constraints indicating the connection between the defined relationships. For example, in the example illustrated in FIG. 4, a relationship constraint by the constraint name "pm-vm pair" indicates that a relationship "pm-vm" and a relationship "vm-pm" are necessarily defined in a pair.

Returning to the explanation with reference to FIG. 2, the initial evaluation performing unit 12 executes an application referring to the relationship information and, from the execution result of the application, computes an evaluation of the relationships stored in the CMDB 15. More particularly, when an error occurs in a CI stored in the CMDB 15, the initial evaluation performing unit 12 executes an application that searches for the error-causing CIs by tracing the relationships from the CIs in which the errors have occurred.

If the application is successful in determining the error-causing CIs, the initial evaluation performing unit 12 calculates initial grades corresponding to the number of determined error-causing CIs and sends the calculated initial grades and the error-causing CIs to the testing unit 14.

Explained below is the sequence of operations performed by the application while tracing the relationships in order to find out the error-causing CIs. Firstly, the application assigns a count "1" to each CI in which an error has occurred. Besides, from among the services provided by each of the virtual machines "VM: vb01" to "VM: vb03", the application calculates the number of services in which errors have occurred by referring to each relationship having one of those virtual machines as the source. Subsequently, to each of the virtual machines "VM: vb01" to "VM: vb03", the application additionally assigns a count that is same as the calculated number of services in which errors have occurred.

Then, the application refers to each relationship having a physical machine as the source and determines the virtual machines that are mounted on each of the physical machines "PM: pm11" to "PM: pm13". Subsequently, to each of the physical machines "PM: pm11" to "PM: pm13", the application additionally assigns a count that is same as the count assigned to the corresponding virtual machine. Finally, the application determines that the CIs having the highest count assigned thereto as the error-causing CIs.

Once the application determines the error-causing CIs, the initial evaluation performing unit 12 calculates, as the initial grade, the multiplicative inverse of the number of error-causing CIs determined to be present. Then, the initial evaluation performing unit 12 sends the calculated initial grade and the error-causing CIs to the testing unit 14.

Figure 5:
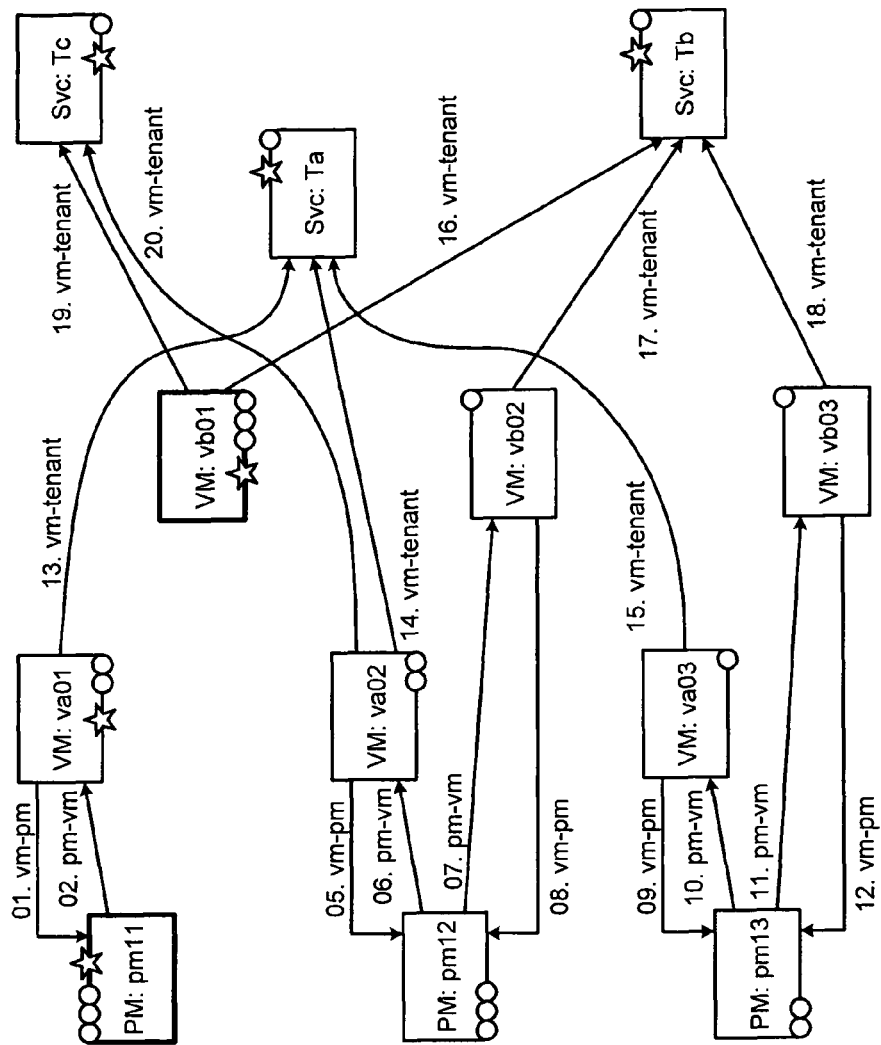
FIG. 5 is an explanatory diagram for explaining an initial grade calculating operation performed with respect to error-causing CIs.

Explained below with reference to FIG. 5 is a specific example of the operation performed by the initial evaluation performing unit 12. FIG. 5 is an explanatory diagram for explaining an initial grade calculating operation performed with respect to error-causing CIs. In FIG. 5, each CI in which an error has occurred is flagged with a star sign. Moreover, each CI is flagged with one or more open dots that represent the count of that CI as assigned by the application.

For example, with respect to the CMDB 15, the initial evaluation performing unit 12 executes the application for searching for the error-causing CIs. The application first assigns a count "1" to each of the CIs "PM: pm11", "VM: va01", "VM: vb01", "SVC: Ta", "SVC: Tb", and "SVC: Tc" in which an error has occurred. Then, from among the services provided by the virtual machine "VM: va01", the application calculates the number of services in which errors have occurred and additionally assigns a count "1", which is same as the calculated number of services, to the virtual machine "VM: va01".

Subsequently, with respect to the physical machine "PM: pm11", the application additionally assigns a count "2" that is same as the count assigned to the virtual machine "VM: va01" mounted on the physical machine "PM: pm11". Thus, with respect to the physical machine "PM: pm11", the assigned count becomes "3".

Herein, since the relationship between the physical machine "PM: pm11" and the virtual machine "VM: vb01" is not stored in the CMDB 15, the application is not able to recognize that the virtual machine "VM: vb01" is mounted on the physical machine "PM: pm11". Consequently, with respect to the physical machine "PM: pm11", the application does not assign the count that is same as the count assigned to the virtual machine "VM: vb01".

In an identical manner, the application assigns a count to each CI. As illustrated in a CI count table in FIG. 5, the application assigns a count "3" to each of the physical machine "PM: pm11", the physical machine "PM: pm12", and the virtual machine "VM: vb01". As a result, the application determines that the physical machine "PM: pm11", the physical machine "PM: pm12", and the virtual machine "VM: vb01" are the error-causing CIs.

Subsequently, the initial evaluation performing unit 12 calculates, as the initial grades, the multiplicative inverse of the number of CIs determined by the application to cause the errors. In the present case, since the application determines that there are three error-causing CIs, the initial evaluation performing unit 12 calculates the initial grade as ⅓=0.33. Then, the initial evaluation performing unit 12 sends the initial grade "0.33" to the testing unit 14 along with the error-causing CIs "PM: pm12", "PM: pm12", and "VM: vb01".

Returning to the explanation with reference to FIG. 2, the prospective extracting unit 13 extracts, based on the information stored in the CMDB 15 and based on predetermined constraint conditions, such relationships between the configuration items that satisfy the predetermined constraint conditions and that are not included in the relationship information. That is, based on the CIs and the relationships stored in the CMDB 15 and based on the constraints stored in the relationship constraint DB 16, the prospective extracting unit 13 extracts prospective relationships. Besides, from among the CIs stored in the CMDB 15, the prospective extracting unit 13 extracts such relationships, between the CIs in which errors have occurred and the other CIs, that satisfy the predetermined constraint conditions and that are not included in the CMDB 15.

More particularly, upon receiving a request from the testing unit 14 for creating prospective relationships, the prospective extracting unit 13 obtains the constraints used while extracting relationships from the relationship constraint DB 16. Upon obtaining the constraints used while extracting relationships, the prospective extracting unit 13 determines whether the relationships between each error-occurring CI and the other CIs satisfy the obtained constraints. Herein, an error-occurring CI represents a CI in which an error has occurred.

Meanwhile, if the relationships are determined not to satisfy the obtained constraints, the prospective extracting unit 13 extracts relationships that satisfy the obtained constraints. Then, the prospective extracting unit 13 sends the extracted relationships as prospective relationships to the testing unit 14.

Figure 6:
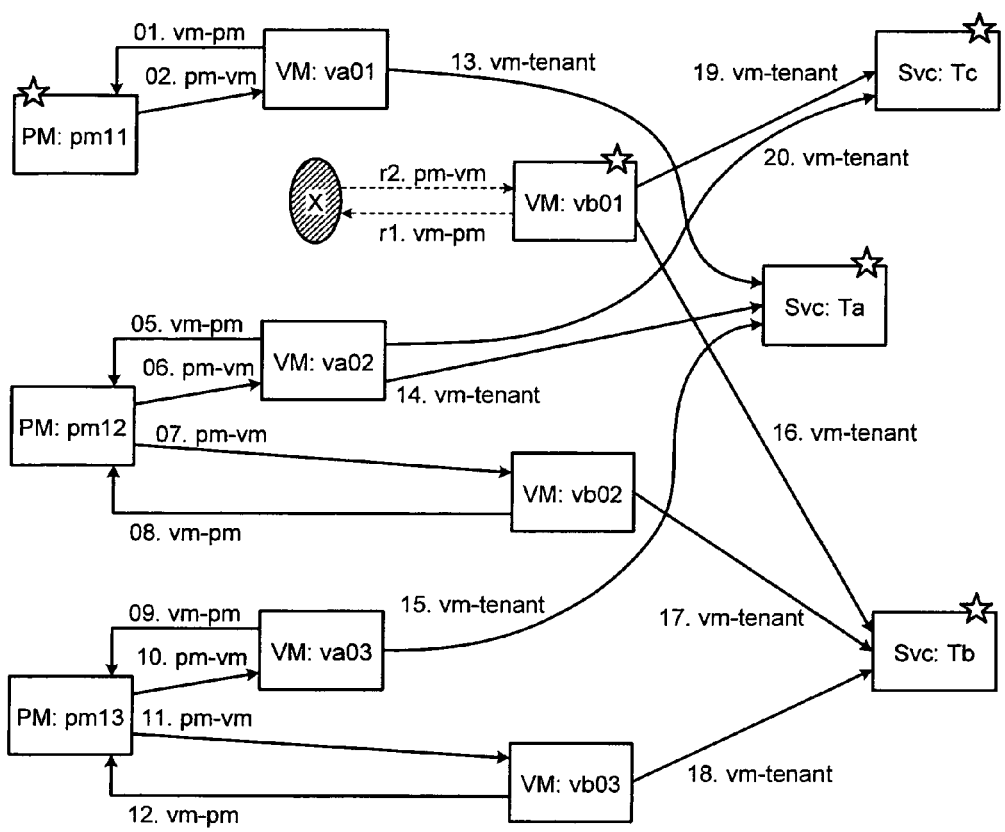
FIG. 6 is an explanatory diagram for explaining an exemplary operation for extracting prospective relationships.

Explained below with reference to FIG. 6 is an example of the extracting operation performed by the prospective extracting unit 13 for extracting prospective relationships. Thus, FIG. 6 is an explanatory diagram for explaining an example of the operation for extracting prospective relationships. In the example illustrated in FIG. 6, it is assumed that an error has occurred in the virtual machine "VM: vb01" and that the prospective extracting unit 13 determines whether the relationships between the virtual machine "VM: vb01" and the other CIs satisfy the various constraints illustrated in FIG. 4.

Firstly, upon receiving a request regarding prospective relationships from the testing unit 14, the prospective extracting unit 13 obtains the constraints illustrated in FIG. 4 from the relationship constraint DB 16. Then, the prospective extracting unit 13 determines whether the relationships between the virtual machine "VM: vb01" and the other CIs satisfy the obtained constraints.

Herein, according to a number constraint illustrated in FIG. 4, the virtual machine "VM: vb01" needs to have a relationship of "vm-pm" format defined with at least a single physical machine. However, with respect to the virtual machine "VM: vb01", a relationship of "vm-pm" format is not defined with any physical machine.

Hence, the prospective extracting unit 13 extracts, from the virtual machine "VM: vb01", a relationship "r1. vm-pm" that extends to some physical machine. Besides, according to the inter-relationship constraint illustrated in FIG. 4, the prospective extracting unit 13 extracts a relationship "r2. pm-vm" that pairs up with the relationship "r1. vm-pm".

Moreover, according to a type constraint illustrated in FIG. 4, the prospective extracting unit 13 determines that either one of the physical machines "PM: pm11" to "PM: pm13" is related to the virtual machine "VM: vb01" by the relationships "r1. vm-pm" and "r2. pm-vm". That is, the prospective extracting unit 13 determines that the virtual machine "VM: vb01" is mounted on either one of the physical machines "PM: pm11" to "PM: pm13".

Furthermore, the prospective extracting unit 13 determines that either one of the physical machines "PM: pm11" to "PM: pm13" satisfies the state transition constraint illustrated in FIG. 4. However, since an error has occurred in the physical machine "PM: pm11" and an error has occurred in the virtual machine "VM: vb01", the prospective extracting unit 13 sends, on a priority basis, the prospective relationships extracted from between the physical machine "PM: pm11" and the virtual machine "VM: vb01" to the testing unit 14.

Figure 7:
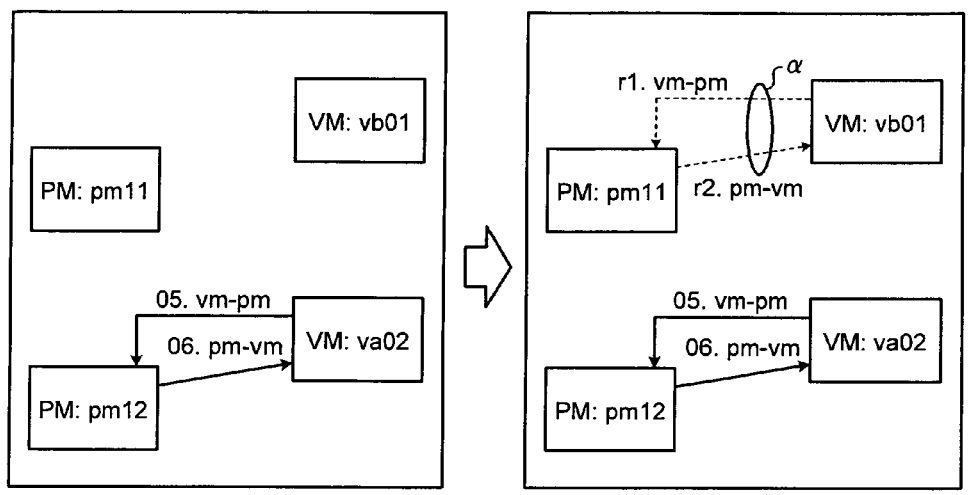
FIG. 7 is an explanatory diagram for explaining an example of prospective relationships.

As a result, as illustrated by a in FIG. 7, the prospective extracting unit 13 extracts the relationships "r1. vm-pm" and "r2. pm-vm" as the prospective relationships between the physical machine "PM: pm11" and the virtual machine "VM: vb01" and sends the prospective relationships "r1. vm-pm" and "r2. pm-vm" to the testing unit 14. Herein, FIG. 7 is an explanatory diagram for explaining an example of prospective relationships.

Moreover, the prospective extracting unit 13 sends, to the testing unit 14, relationships "r3. vm-pm" and "r4. pm-vm" as the prospective relationships between the physical machine "PM: pm12" and the virtual machine "VM: vb01". Similarly, the prospective extracting unit 13 sends, to the testing unit 14, relationships "r5. vm-pm" and "r6. pm-vm" as the prospective relationships between the physical machine "PM: pm13" and the virtual machine "VM: vb01".

Returning to the explanation with reference to FIG. 2, the testing unit 14 executes an application referring to the extracted prospective relationships and obtains an evaluation result regarding the extracted prospective relationships. That is, as the application referring to the extracted prospective relationships, the testing unit 14 executes an application that searches for prospective CIs that have caused errors. Then, the testing unit 14 obtains an evaluation result that indicates that fewer the prospective error-causing CIs found out by the application, more appropriate are the extracted prospective relationships.

More particularly, the testing unit 14 obtains the CIs determined to have caused errors and the initial grade of each CI from the initial evaluation performing unit 12 and then determines whether any initial grade is equal to or higher than a threshold value. If any initial grade is determined to be equal to or higher than the threshold value, the testing unit 14 informs the UI unit 11 about the CIs obtained from the initial evaluation performing unit 12. On the other hand, if no initial grade is determined to be equal to or higher than the threshold value, the testing unit 14 issues a prospective relationship creating request to the prospective extracting unit 13.

Once the prospective extracting unit 13 extracts prospective relationships, the testing unit 14 obtains the extracted prospective relationships and applies each of the prospective relationships to the relationships stored in the CMDB 15.

Then, the testing unit 14 executes an application that refers to the relationships to which each of the extracted prospective relationships is applied and searches for the error-causing CIs. According to the execution result of the application, the testing unit 14 assigns grades to the error-causing CIs.

Herein, with respect to each CI in which an error has occurred, the testing unit 14 determines whether that CI itself is the origin of the corresponding error. A particular CI itself is the origin of an error if the error has occurred not only in that CI but also in CIs positioned downstream of that CI and if no error has occurred in CIs positioned upstream of that CI. In this case, for example, the physical machines are the CIs positioned upstream of the virtual machines and the services, and the virtual machines are the CIs positioned upstream of the services.

Regarding the CIs being the origins of respective errors, if the grades exceed the respective initial grades assigned by the initial evaluation performing unit 12, then the testing unit 14 creates a grade table in which the CIs being the origins of respective errors are listed in a corresponding manner to the respective grades and the respective relationships. The testing unit 14 then sends the grade table to the UI unit 11.

Meanwhile, if it is determined that it is not possible to uniquely identify the origin of an error, then the testing unit 14 does not assign grades to the obtained prospective relationships and destroys the information regarding the obtained prospective relationships without registering them in the grade table.

The operations performed by the testing unit 14 are explained below with reference to a specific example. Firstly, from among the operations performed by the testing unit 14, the explanation is given about the operation of determining whether an initial grade exceeds a threshold value. For example, it is assumed that the testing unit 14 obtains the physical machine "PM: pm11", the physical machine "PM: pm12", and the virtual machine "VM: vb01" as the CIs that are determined to have caused errors by the initial evaluation performing unit 12. Moreover, it is also assumed that the testing unit 14 obtains the initial grade "0.33" of each of the abovementioned obtained CIs.

If the threshold value to be compared with the initial grades is assumed to be "0.5", the testing unit 14 determines that the initial grade "0.33" of each obtained CI does not exceed the threshold value of "0.5". In such a case, the testing unit 14 issues a prospective relationship creating request to the prospective extracting unit 13.

The following is an explanation about a specific example of the operation of applying the prospective relationships that the testing unit 14 obtains from the prospective extracting unit 13. For example, it is assumed that the testing unit 14 obtains the prospective relationships "r1. vm-pm" and "r2. pm-vm", which are extracted by the prospective extracting unit 13, and applies those prospective relationships.

Figure 8:
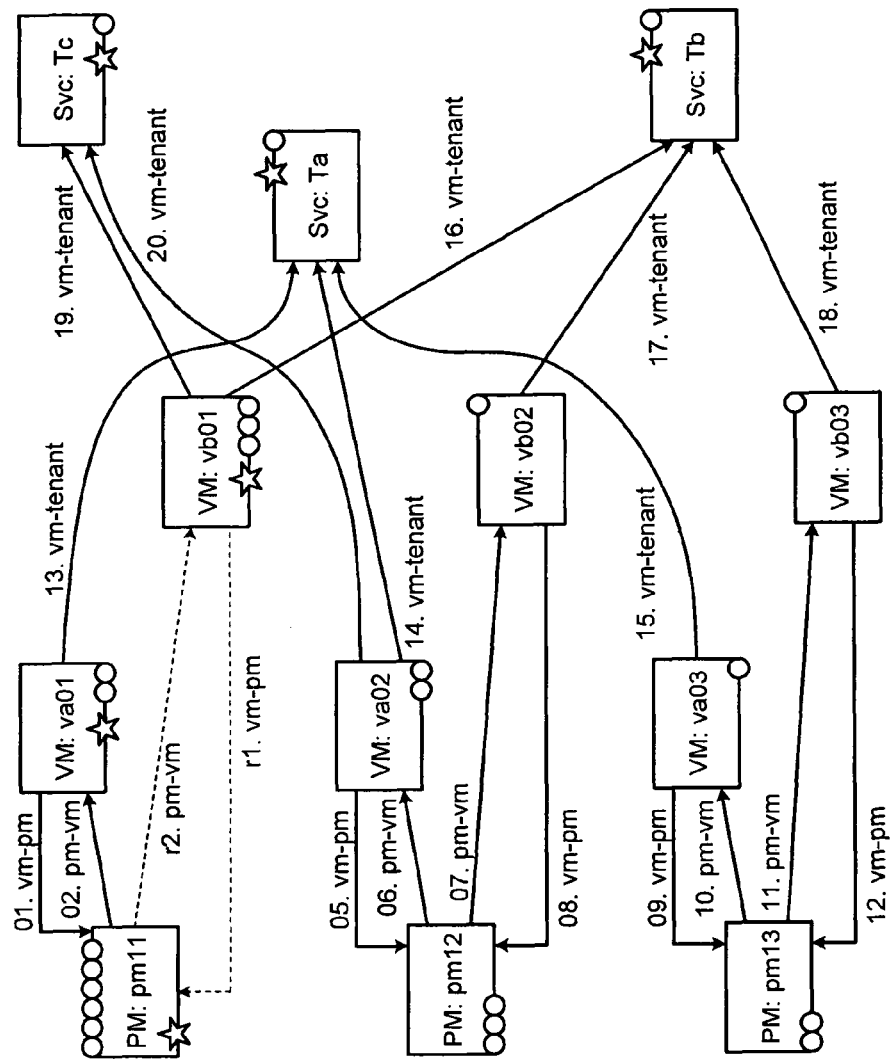
FIG. 8 is an explanatory diagram for explaining an operation of applying prospective relationships "r1. vm-pm" and "r2. pm-vm"

FIG. 8 is an explanatory diagram for explaining the operation of applying the prospective relationships "r1. vm-pm" and "r2. pm-vm". As illustrated in FIG. 8, the testing unit 14 applies the prospective relationships "r1. vm-pm" and "r2. pm-vm" to each CI and each relationship stored in the CMDB 15. That is, the testing unit 14 assumes that the relationships between the virtual machine "VM: vb01" and the physical machine "PM: pm11" are represented by the prospective relationships "r1. vm-pm" and "r2. pm-vm".

From among the operations performed by the testing unit 14, the following is an explanation about a specific example of the operation of executing an application that searches for the error-causing CIs by referring to the relationships to which the prospective relationships are applied. For example, in the example illustrated in FIG. 8, the testing unit 14 executes, in an identical manner to the initial evaluation performing unit 12, an application for searching for the error-causing CIs.

The application searches for the error-causing CIs by tracing the relationships stored in the CMDB 15 and the prospective relationships "r1. vm-pm" and "r2. pm-vm" that have been applied. As a result of applying the prospective relationships "r1. vm-pm" and "r2. pm-vm", the application assigns "6" as the highest count to the physical machine "PM: pm11".

Thus, when the testing unit 14 applies the prospective relationships "r1. vm-pm" and "r2. pm-vm", the application determines that the physical machine "PM: pm11" is an error-causing CI.

The following is an explanation about a specific example of the operation when the testing unit 14 assigns grades to the error-causing CIs according to the execution result of the application. For example, once the application determines the error-causing CIs, the testing unit 14 assigns, to each error-causing CI, the multiplicative inverse of the number of error-causing CIs as a grade. That is, when the application determines the physical machine "PM: pm11" to be an error-causing CI, the testing unit 14 assigns "1" as the grade to the physical machine "PM: pm11".

The following is an explanation about a specific example of an origin determining operation in which, with respect to each CI in which an error has occurred, the testing unit 14 determines whether that CI itself is the origin of the corresponding error. For example, the testing unit 14 determines that an error has occurred in the physical machine "PM: pm11". In the example illustrated in FIG. 8, the testing unit 14 determines that the error has also occurred in the CIs positioned downstream of the physical machine "PM: pm11". Moreover, the testing unit 14 determines that no error has occurred in the CIs positioned upstream to the physical machine "PM: pm11". Consequently, the testing unit 14 determines that the physical machine "PM: pm11" is the origin of the error.

As a result, when the prospective relationships "r1. vm-pm" and "r2. pm-vm" are applied, the testing unit 14 determines that only the physical machine "PM: pm11" is the origin of the error as illustrated in a CI count table in FIG. 8.

Thus, the origin determining operation enables the testing unit 14 to determine whether, upon applying the prospective relationships, it is possible to uniquely identify a CI as the origin of an error. Herein, the errors are often attributed to an error occurring in an independent CI. Hence, by determining whether a single CI can be identified as the origin of an error, it becomes possible to identify the appropriate prospective relationships.

The following is an explanation about a specific example of the operation when the testing unit 14 sends the created grade table to the UI unit 11. For example, regarding the physical machine "PM: pm11" determined to be the origin of an error, the testing unit 14 compares the initial grade "0.33" assigned by the initial evaluation performing unit 12 with the grade "1" assigned by itself, and determines that the grade assigned by itself is higher than the grade assigned by the initial evaluation performing unit 12. Moreover, regarding the physical machine "PM: pm11" determined to be the origin of an error, when the grade assigned by itself is determined to be higher than the grade assigned by the initial evaluation performing unit 12, the testing unit 14 creates a grade table and sends it to the UI unit 11.

FIG. 9 is an explanatory diagram for explaining the grade table of prospective relationships according to the second embodiment. As illustrated in FIG. 9, the testing unit 14 creates the grade table in which each of the prospective relationships "r1. vm-pm" and "r2. pm-vm" is specified in a corresponding manner to the grade assigned to the corresponding CI determined to be the origin of an error and in a corresponding manner to the respective related CIs. Then, the testing unit sends the created grade table to the UI unit 11.

In this way, the testing unit 14 creates a grade table in which the grades that are assigned to the CIs determined to be the origins of errors are specified in a corresponding manner to the prospective relationships. Herein, the grades that are assigned to the CIs determined to be the origins of errors are assigned according to the execution result of the application. Meanwhile, fewer the error-causing CIs determined by the application, higher are the grades assigned by the testing unit 14 to the error-causing CIs. Hence, the testing unit 14 obtains an evaluation result that indicates that fewer the error-causing CIs determined by the application, more appropriate are the extracted prospective relationships.

Figure 10:
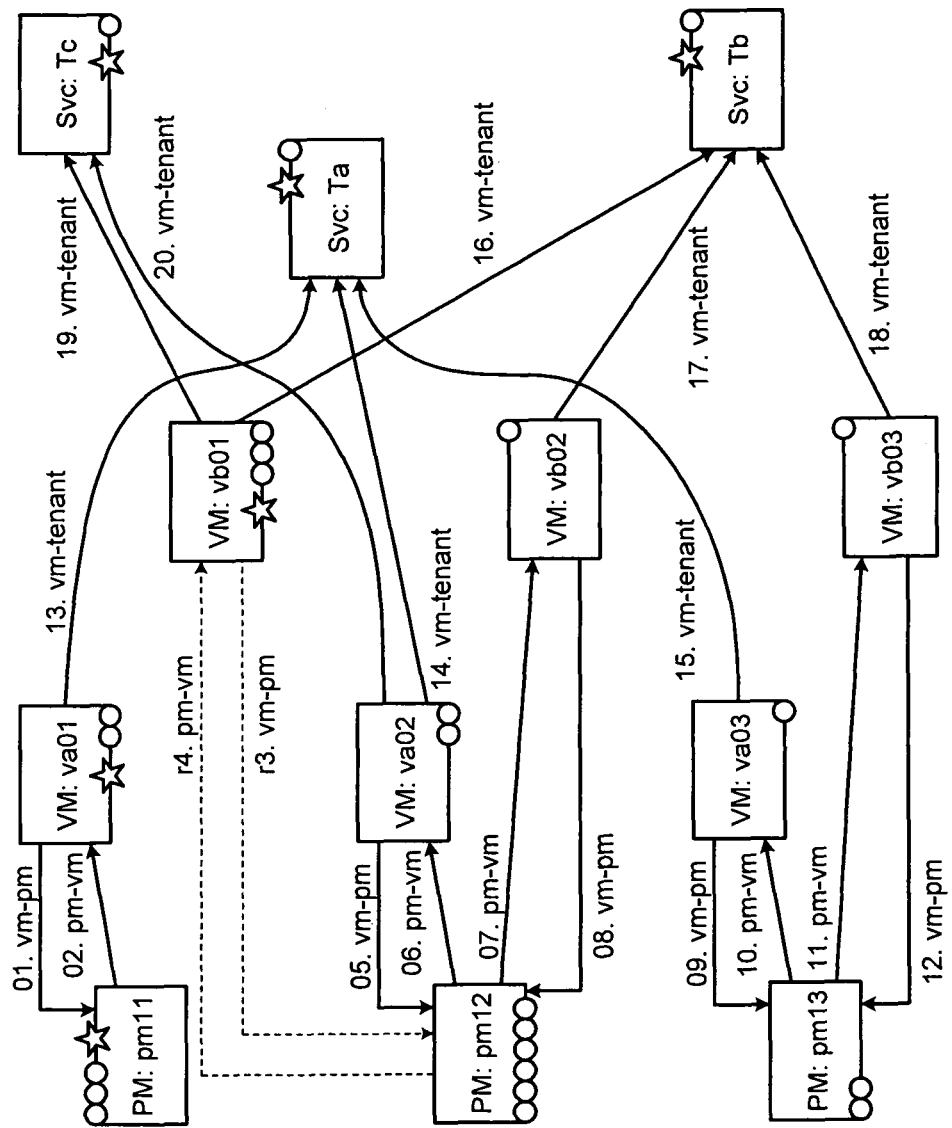
FIG. 10 is an explanatory diagram for explaining an operation of applying prospective relationships "r3. vm-pm" and "r4. pm-vm"

Explained below with reference to a plurality of diagrams is an example of the case when the testing unit 14 obtains other prospective relationships. Firstly, with reference to FIG. 10, the explanation is given about an example when the testing unit 14 obtains the prospective relationships "r3. vm-pm" and "r4. pm-vm" and applies those prospective relationships to the relationships stored in the CMDB 15. Thus, FIG. 10 is an explanatory diagram for explaining the operation of applying the prospective relationships "r3. vm-pm" and "r4. pm-vm".

Firstly, the testing unit 14 obtains the prospective relationships "r3. vm-pm" and "r4. pm-vm" from the prospective extracting unit 13. Then, as illustrated in FIG. 10, the testing unit applies the prospective relationships "r3. vm-pm" and "r4. pm-vm" to the relationships stored in the CMDB 15. That is, the testing unit 14 assumes that the relationships between the virtual machine "VM: vb01" and the physical machine "PM: pm12" are represented by the prospective relationships "r3. vm-pm" and "r4. pm-vm".

Then, the testing unit 14 executes the application that searches for the error-causing CIs. Herein, when the prospective relationships "r3. vm-pm" and "r4. pm-vm" are applied, the physical machine "PM: pm12" gets assigned with the highest count as illustrated in a CI count table in FIG. 10. Hence, the application determines the physical machine "PM: pm12" to be an error-causing CI.

When the physical machine "PM: pm12" is determined to be an error-causing CI, the testing unit assigns "1" as the grade to the physical machine "PM: pm12". Moreover, when the prospective relationships "r3. vm-pm" and "r4. pm-vm" are applied, the testing unit 14 determines that the constituent element indicated by the physical machine "PM: pm11" and the virtual machine "VM: vb01" is the CI that is the origin of the respective errors.

Since most of the failures occurring in the CIs stored in the CMDB 15 can often be attributed to a single CI, it is desirable that a single CI is determined to be the origin of the error. For that reason, when the prospective relationships "r3. vm-pm" and "r4. pm-vm" are applied, the testing unit 14 determines that it is not possible to identify a single origin of the error. In that case, the testing unit 14 does not assign grades to the obtained prospective relationships and destroys the information regarding the obtained prospective relationships without registering them in the grade table.

Figure 11:
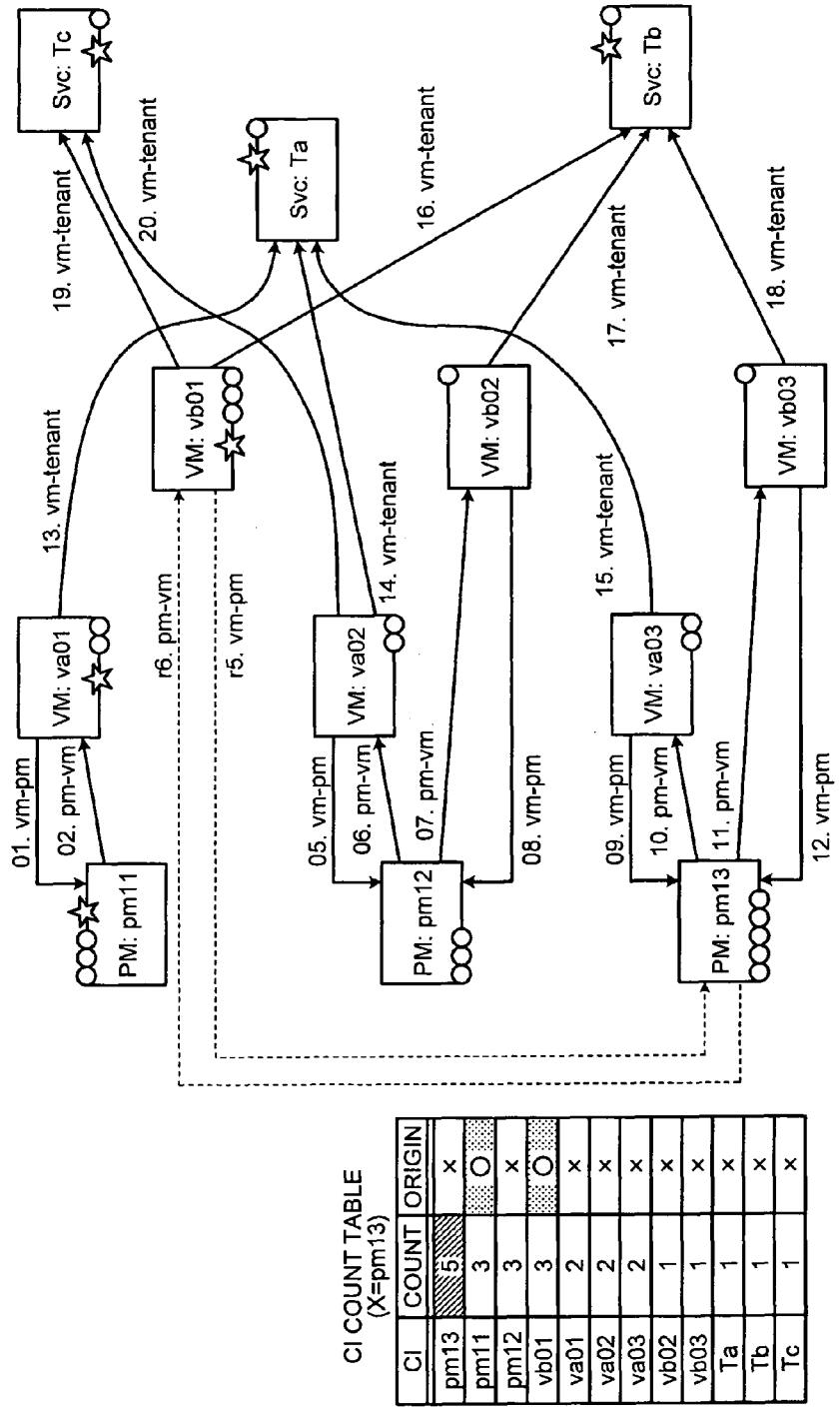
FIG. 11 is an explanatory diagram for explaining an operation of applying prospective relationships "r5. vm-pm" and "r6. pm-vm"

From among the operations performed by the testing unit 14, explained below with reference to FIG. 11 is an example when the testing unit 14 obtains the prospective relationships "r5. vm-pm" and "r6. pm-vm" and applies those prospective relationships to the relationships stored in the CMDB 15. Thus, FIG. 11 is an explanatory diagram for explaining the operation of applying the prospective relationships "r5. vm-pm" and "r6. pm-vm".

Firstly, the testing unit 14 obtains the prospective relationships "r5. vm-pm" and "r6. pm-vm" from the prospective extracting unit 13. Then, as illustrated in FIG. 11, the testing unit applies the prospective relationships "r5. vm-pm" and "r6. pm-vm" to the relationships stored in the CMDB 15. That is, the testing unit 14 assumes that the relationships between the virtual machine "VM: vb01" and the physical machine "PM: pm13" are represented by the prospective relationships "r5. vm-pm" and "r6. pm-vm".

Then, the testing unit 14 executes the application that searches for the error-causing CIs. Herein, when the prospective relationships "r5. vm-pm" and "r6. pm-vm" are applied, the physical machine "PM: pm13" gets assigned with the highest count as illustrated in a CI count table in FIG. 11. Hence, the application determines the physical machine "PM: pm13" to be an error-causing CI and assigns thereto the grade "1".

Moreover, when the prospective relationships "r5. vm-pm" and "r6. pm-vm" are applied, the testing unit 14 determines that the constituent element indicated by the physical machine "PM: pm11" and the virtual machine "VM: vb01" is the origin of the respective errors. Hence, the testing unit 14 determines that a single origin of the error cannot be identified. In that case, the testing unit 14 does not assign grades to the obtained prospective relationships and destroys the information regarding the obtained prospective relationships without registering them in the grade table.

As a result, as illustrated in FIG. 9, the testing unit 14 creates the grade table in which each of the prospective relationships "r1. vm-pm" and "r2. pm-vm" is specified in a corresponding manner to the grade assigned to the corresponding CI determined to be the origin of an error and in a corresponding manner to the respective related CIs. Then, the testing unit sends the created grade table to the UI unit 11.

Returning to the explanation with reference to FIG. 2, the UI unit 11 follows the evaluation result obtained by the testing unit 14 and additionally registers the prospective relationships extracted by the prospective extracting unit 13. More particularly, the UI unit 11 obtains all error-causing CIs that are determined by the application executed by the initial evaluation performing unit 12 and then displays the obtained CIs to the user.

Besides, the UI unit 11 obtains the grade table created by the testing unit 14 and displays the grade table to the user. Upon displaying the grade table to the user, if the user issues a request for registering particular prospective relationships specified in the displayed grade table, then the UI unit 11 registers the requested prospective relationships in the CMDB 15.

In other words, the UI unit 11 obtains the grade table in which are stored the prospective relationships that have been evaluated to be appropriate. Then, from among the prospective relationships stored in the grade table, the UI unit 11 registers in the CMDB 15 those prospective relationships for which the user issues a registration request.

Figure 12:
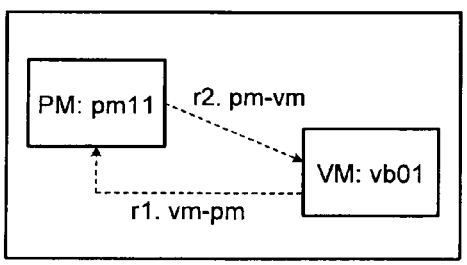
FIG. 12 illustrates an exemplary inquiry display that is displayed to the user.

For example, as illustrated in FIG. 12, the UI unit 11 displays the prospective relationships "r1. vm-pm" and "r2. pm-vm" to the user. FIG. 12 illustrates an exemplary inquiry display that is displayed to the user. In the case of supplementing particular relationships, the user ticks the respective registration check boxes illustrated in FIG. 12 and presses an OK button. As a result, a relationship registration request is issued to the UI unit 11.

Figure 13:
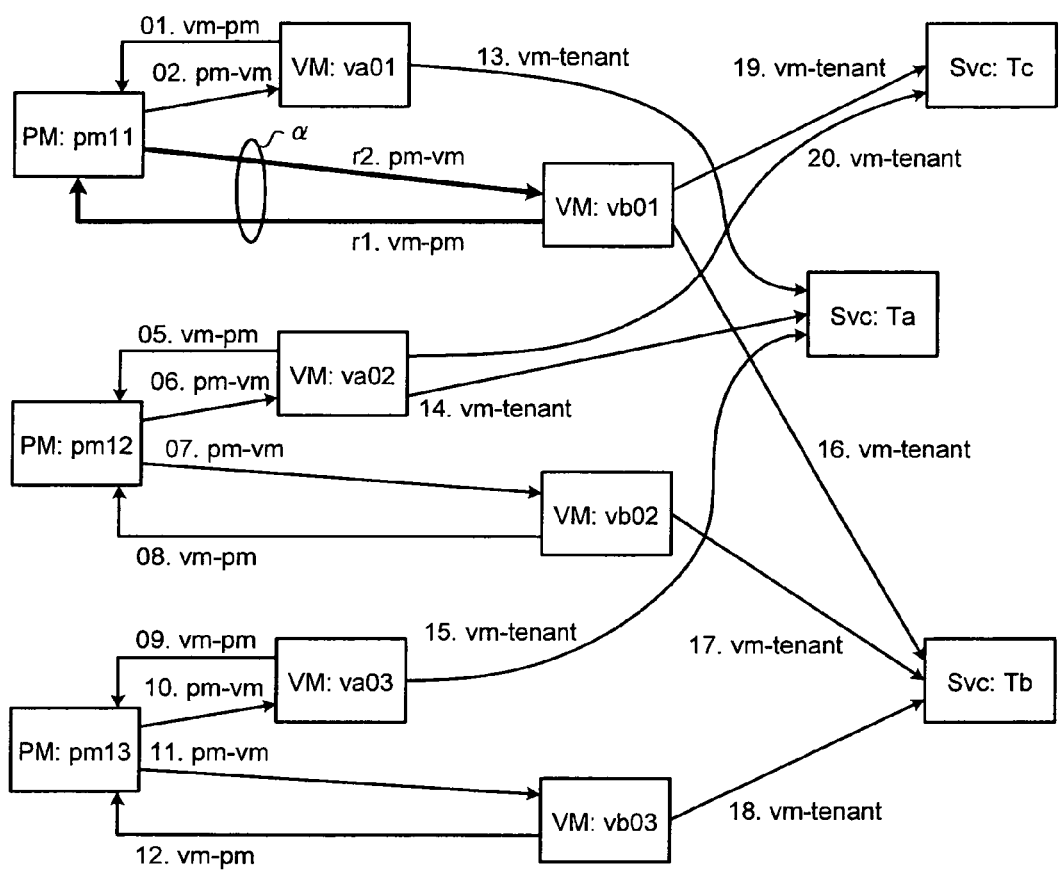
FIG. 13 is an explanatory diagram for explaining an example of a registration operation according to the second embodiment.

Upon receiving a relationship registration request from the user, the UI unit 11 registers the prospective relationships "r1. vm-pm" and "r2. pm-vm" in the CMDB 15 as illustrated by a in FIG. 13, which is an explanatory diagram for explaining an example of the registration operation according to the second embodiment.

Meanwhile, the UI unit 11, the initial evaluation performing unit 12, the prospective extracting unit 13, and the testing unit 14 are, for example, electronic circuits. As an exemplary electronic circuit, it is possible to use an integrated circuit such as an application specific integrated circuit (ASIC) or a field programmable gate array (FPGA), or use a central processing unit (CPU) or a micro processing unit (MPU).

The CMDB 15 as well as the relationship constraint DB 16 is a random access memory (RAM), a read only memory (ROM), or a semiconductor memory element such as a flash memory, or is a memory device such as a hard disk or an optical disk.

Operations Performed by Supplementing Device

Figure 14:
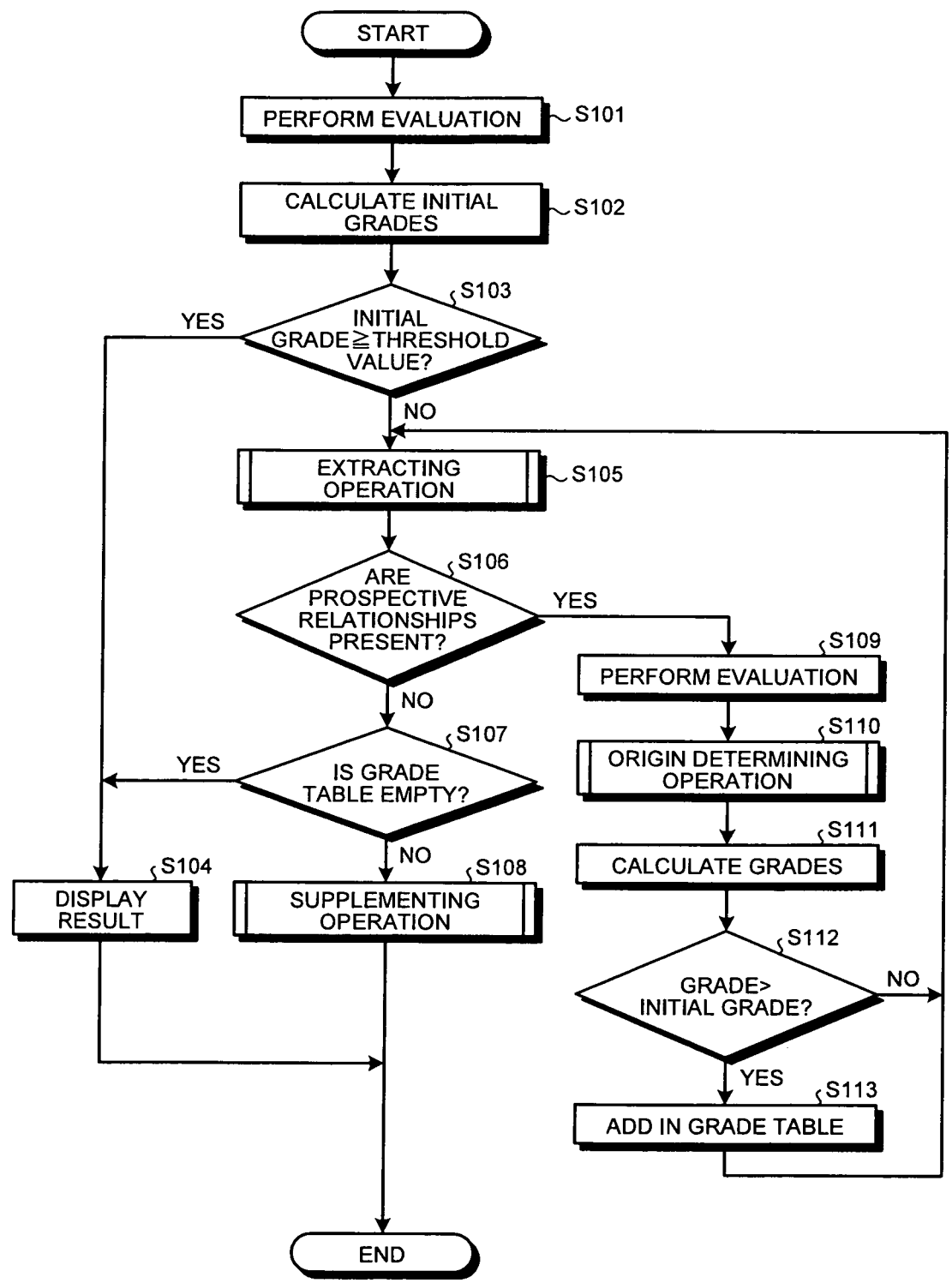
FIG. 14 is a flowchart for explaining the sequence of operations performed by the supplementing device according to the second embodiment.

Explained below with reference to the diagrams is the sequence of operations performed by the supplementing device 10. Firstly, the sequence of operations performed by the supplementing device 10 is explained with reference to FIG. 14, which is a flowchart for explaining the same. The supplementing device 10 starts the operations as soon as the power is turned ON.

Firstly, the supplementing device 10 executes an application for the purpose of evaluating the CIs and the relationships that are stored in the CMDB 15 (Step S101) and calculates the initial grades with respect to the error-causing CIs (Step S102). Then, the supplementing device 10 determines whether the calculated initial grades are equal to or higher than a threshold value (Step S103). If an initial grade is determined to be equal to or higher than the threshold value (Yes at Step S103), then the supplementing device 10 displays the information regarding the corresponding error-causing CI to the user (Step S104) and ends the operations.

On the other hand, if the initial grades are determined to be lower than the threshold value (No at Step S103), then the supplementing device 10 performs the extracting operation (Step S105). If the extracting operation results in the extraction of prospective relationships (Yes at Step S106), then the supplementing device 10 evaluates the relationships to which the extracted prospective relationships are applied (Step S109). That is, the supplementing device 10 executes the application for searching for the error-causing CIs and, based on the execution result of the application, evaluates the relationships to which the extracted prospective relationships are applied.

Subsequently, the supplementing device 10 performs the origin determining operation and determines the CIs that are the origins of respective errors (Step S110). Then, with respect to the CIs that are the origins of respective errors, the supplementing device 10 calculates the grades (Step S111). Upon calculating the grades, the supplementing device 10 determines whether the calculated grades are higher than the respective initial grades (Step S112).

If any calculated grade is determined to be higher than the corresponding initial grade (Yes at Step S112), then the supplementing device 10 adds that particular CI, which is determined to be the origin of the corresponding error, in the grade table (Step S113). On the other hand, if no calculated grade is determined to be higher than the corresponding initial grade (No at Step S112), then the supplementing device 10 repeats the extracting operation (Step S105).

Meanwhile, if the extracting operation does not result in the extraction of prospective relationships (No at Step S106), then the supplementing device 10 determines whether the grade table is empty without having any CIs recorded therein (Step S107). If the grade table is determined to have CIs recorded therein (No at Step S107), then the supplementing device 10 performs the supplementing operation (Step S108) and ends the operations. On the other hand, if the grade table is determined to be empty (Yes at Step S107), then the supplementing device 10 displays the fact that prospective relationships to be supplemented were not extracted (Step S104) and ends the operations.

Figure 15:
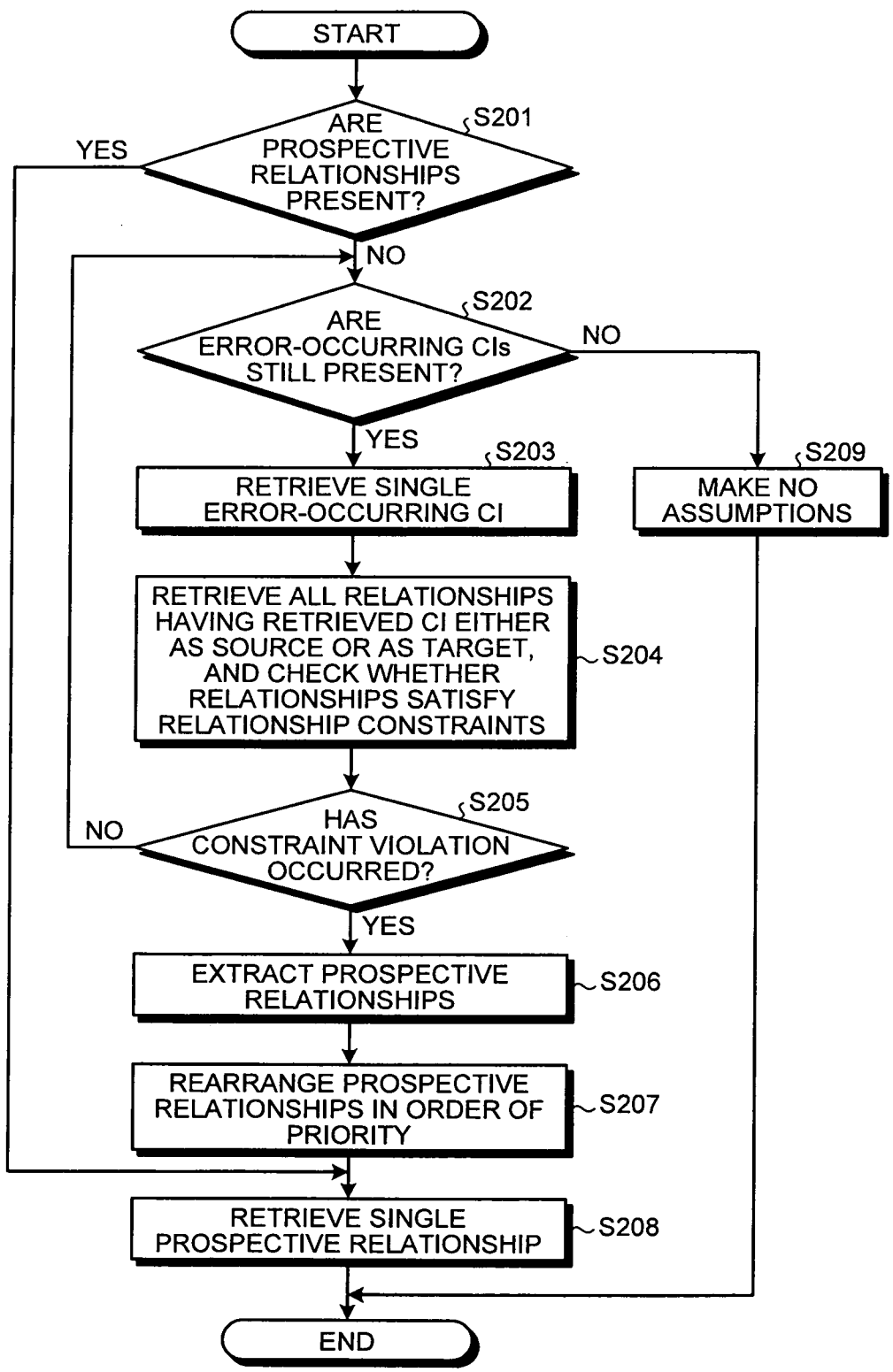
FIG. 15 is a flowchart for explaining the sequence in an extracting operation according to the second embodiment.

Explained below with reference to FIG. 15 is the sequence in the extracting operation performed by the supplementing device 10. FIG. 15 is a flowchart for explaining the sequence in the extracting operation. The supplementing device 10 starts the extracting operation when the initial grades are determined to be lower than the threshold value (No at Step S103).

Firstly, the supplementing device 10 determines whether any prospective relationship is left unevaluated at Step S109 (Step S201). If no prospective relationship is left unevaluated (No at Step S201), then the supplementing device 10 determines whether any error-occurring CI is present for which prospective relationships are not yet extracted (Step S202).

If error-occurring CIs without having extracted prospective relationships are determined to be present (Yes at Step S202), then the supplementing device 10 retrieves one of such error-occurring CIs for which prospective relationships are not yet extracted (Step S203). Subsequently, the supplementing device 10 retrieves all the relationships that have the retrieved CI either as the source or as the target, and checks whether those relationships satisfy the relationship constraints (Step S204). That is, the supplementing device 10 determines whether any constraint violation has occurred (Step S205).

If any constraint violation is found to have occurred (Yes at Step S205), then the supplementing device 10 extracts the prospective relationships satisfying all constraints (Step S206) and, based on the relationship constraints, rearranges the extracted prospective relationships in order of priority (Step S207).

Subsequently, the supplementing device 10 retrieves a prospective relationship of high priority (Step S208) and ends the extracting operation. Meanwhile, if error-occurring CIs without having extracted prospective relationships are determined to be absent (No at Step S202), then the supplementing device 10 ends the extracting operation without creating any prospective relationships (Step S209).

Meanwhile, if any prospective relationship is left unevaluated (Yes at Step S201), then the supplementing device 10 retrieves a prospective relationship of high priority (Step S208) and ends the extracting operation. Moreover, if no constraint violation is found to have occurred (No at Step S205), then the supplementing device 10 determines whether any error-occurring CI is present for which prospective relationships are not yet extracted (Step S202).

Figure 16:
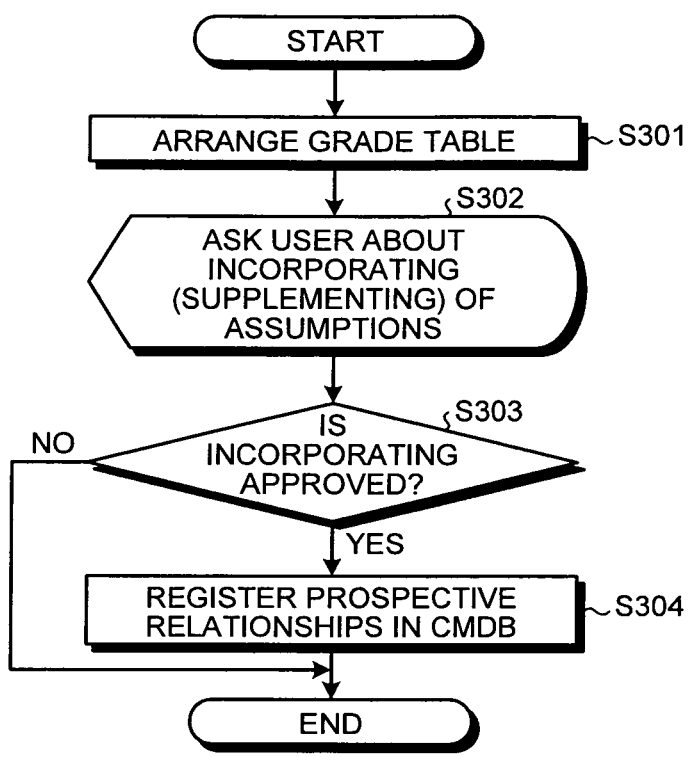
FIG. 16 is a flowchart for explaining the sequence in a supplementing operation according to the second embodiment.

Explained below with reference to FIG. 16 is the sequence in the supplementing operation performed by the supplementing device 10. FIG. 16 is a flowchart for explaining the sequence in the supplementing operation. The supplementing device 10 starts the supplementing operation when the grade table is determined to have CIs recorded therein (No at Step S107).

Firstly, the supplementing device 10 arranges the grade table in order of priority (Step S301). Then, the supplementing device 10 displays the arranged grade table to the user and asks the user about incorporating the prospective relationships (Step S302). If the user selects particular prospective relationships to be incorporated from among the displayed prospective relationships (Yes at Step S303), then the supplementing device 10 registers the selected prospective relationships in the CMDB 15 (Step S304) and ends the supplementing operation.

On the other hand, if the user does not select any prospective relationship (No at Step S303), then the supplementing device 10 ends the supplementing operation without registering any prospective relationship in the CMDB 15.

Figure 17:
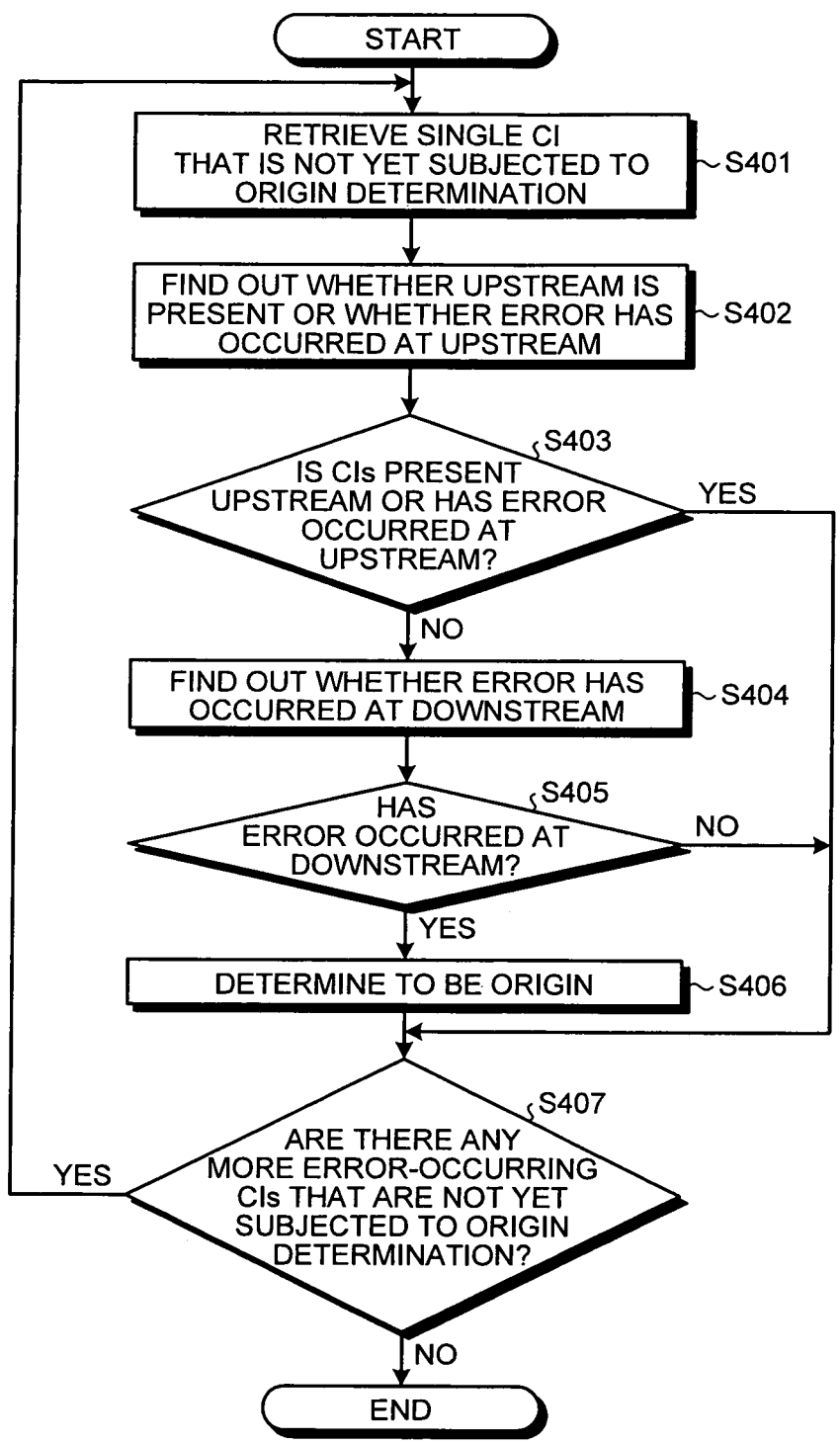
FIG. 17 is a flowchart for explaining the sequence in an origin determining operation according to the second embodiment.

Explained below with reference to FIG. 17 is the sequence in the origin determining operation performed by the supplementing device 10. FIG. 17 is a flowchart for explaining the sequence in the origin determining operation. The supplementing device 10 starts the origin determining operation upon evaluating the relationships to which the extracted prospective relationships are applied (Step S109).

Firstly, from among the error-occurring CIs, the supplementing device 10 retrieves a CI that is not yet subjected to origin determination (Step S401). Then, the supplementing device 10 finds out whether any CIs are present at upstream of the retrieved CI or whether an error has occurred in any CI positioned upstream of the retrieved CI (Step S402).

When no CIs are found at upstream of the retrieved CI or when no error is found to have occurred in any CI positioned upstream of the retrieved CI (No at Step S403), then the supplementing device 10 finds out whether an error-occurring CI is present at downstream of the retrieved CI (Step S404). If an error-occurring CI is found at downstream of the retrieved CI (Yes at Step S405), then the supplementing device 10 determines that the retrieved CI is the origin of the corresponding error (Step S406).

Subsequently, the supplementing device 10 determines whether there are any more error-occurring CIs that are not yet subjected to origin determination (Step S407). If there are error-occurring CIs that are not yet subjected to origin determination (Yes at Step S407), then the supplementing device 10 retrieves a CI from among the CIs that are not yet subjected to origin determination (Step S401). On the other hand, if there is no error-occurring CI that is yet to be subjected to origin determination (No at Step S407), then the supplementing device 10 ends the origin determining operation.

Meanwhile, if no error-occurring CI is found at downstream of the retrieved CI (No at Step S405), the supplementing device 10 continues the origin determining operation without determining that the retrieved CI is the origin of the corresponding error. Moreover, when a CI is found at upstream of the retrieved CI or when an error is found to have occurred in a CI positioned upstream of the retrieved CI (Yes at Step S403), then the supplementing device 10 continues the origin determining operation without determining that the retrieved CI is the origin of the corresponding error.

Effect of Second Embodiment

As described above, the supplementing device 10 according to the second embodiment extracts prospective relationships that satisfy the predetermined constraint conditions, evaluates the extracted prospective relationships, and registers them in the CMDB 15 depending on the evaluation.

Hence, without forcing the user to confirm whether all relationships are properly defined, the supplementing device 10 is able to supplement the undefined relationships. Thus, the supplementing device 10 enables achieving reduction in the time and efforts required for supplementing the undefined relationships. As a result, the task of supplementing the undefined relationships is performed without difficulty.

Meanwhile, the supplementing device extracts only such relationships, between the CIs in which errors have occurred and the other CIs, that satisfy the predetermined constraint conditions. Thus, the supplementing device 10 need not extract the prospective relationships for all of the CIs stored in the CMDB 15. As a result, the supplementing device 10 can extract prospective relationships in an efficient manner.

Moreover, while extracting prospective relationships, the supplementing device 10 extracts only such prospective relationships that satisfy the type constraints, the number constraints, the state transition constraints, and the inter-relationship constraints. Thus, the supplementing device 10 need not extract the prospective relationships for each pair of CIs. As a result, the supplementing device 10 can extract prospective relationships in an efficient manner.

That is, when a type constraint is imposed, the supplementing device 10 can limit the prospective relationships extracted for each pair of CIs only to those prospective relationships that comply with the types of those CIs. Similarly, when a number constraint is imposed, the supplementing device 10 can limit the number of prospective relationships extracted for each pair of CIs.

Moreover, when a state transition constraint is imposed, the supplementing device 10 can limit the combinations of CIs for which the prospective relationships are extracted. Furthermore, when an inter-relationship constraint is imposed, the supplementing device 10 can extract the undefined relationship in a reliable manner. Hence, even when any of the constraints are imposed, the supplementing device 10 can extract prospective relationships in an efficient manner.

[c] Third Embodiment

In a third embodiment of the present invention, the configuration and the sequence of operations of a supplementing device that is connected to a CMDB are explained in that order. Regarding the operations identical to those explained in the second embodiment, the explanation is not repeated while only indicating that a particular operation is identical.

Figure 18:
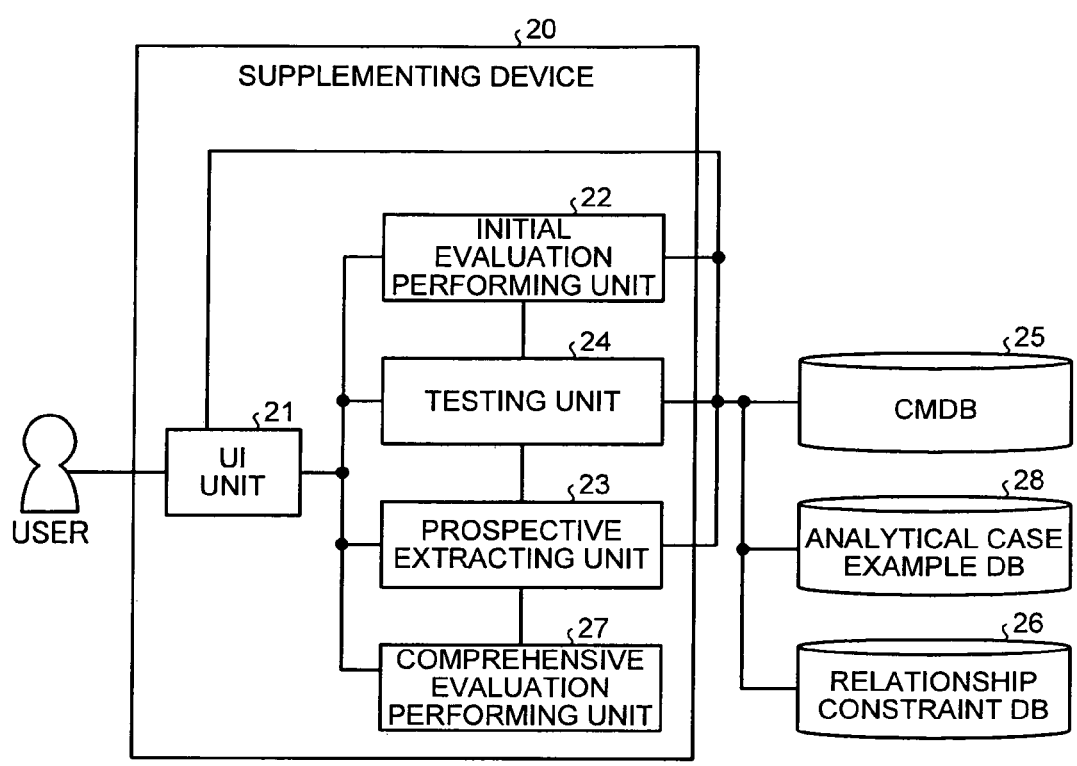
FIG. 18 is a block diagram of a supplementing device according to a third embodiment according to the present invention.

Firstly, with reference to FIG. 18, a configuration of a supplementing device 20 according to the third embodiment is explained. FIG. 18 is a block diagram of the supplementing device according to the third embodiment. As illustrated in FIG. 18, the supplementing device 20 according to the third embodiment includes a UI unit 21, an initial evaluation performing unit 22, a prospective extracting unit 23, a testing unit 24, and a comprehensive evaluation performing unit 27. Besides, the supplementing device 20 is connected to a CMDB 25, an analytical case example DB 28, and a relationship constraint DB 26.

Figures 19, 20:
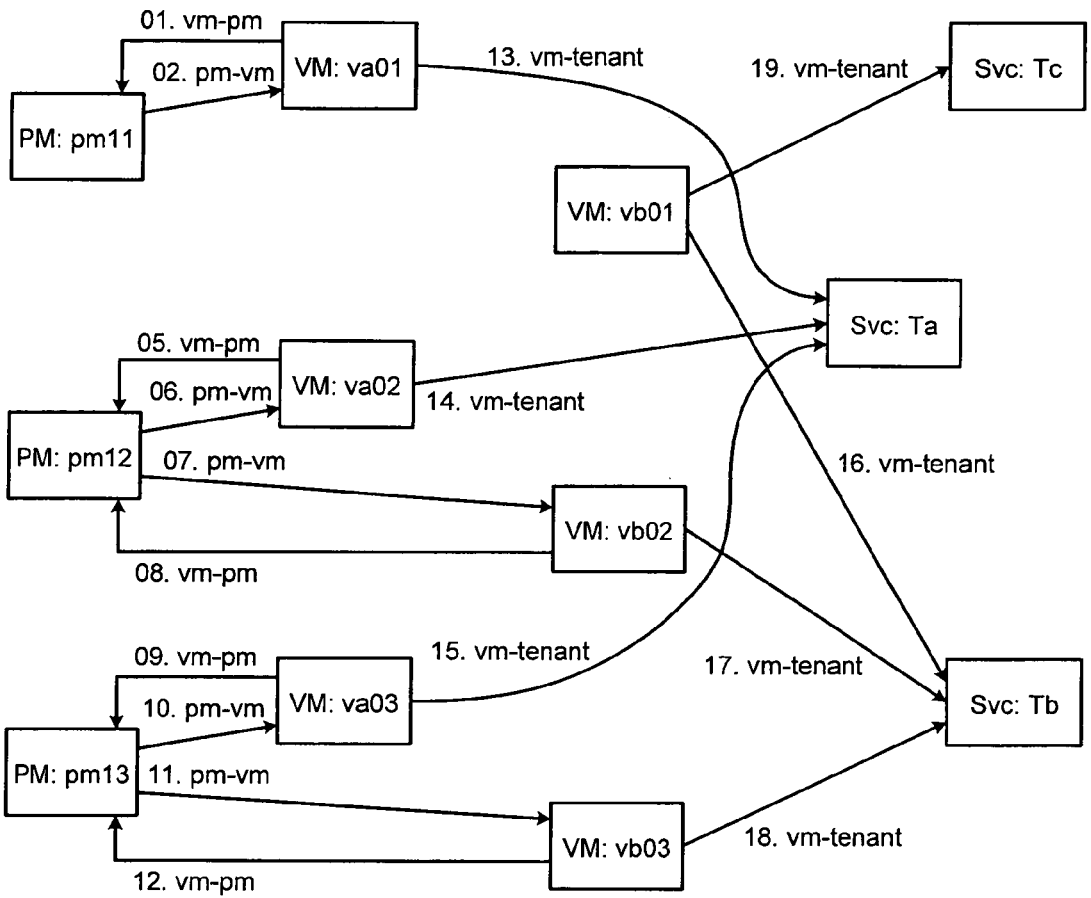
FIG. 19 is an explanatory diagram for explaining the exemplary information stored in a CMDB according to the third embodiment.
FIG. 20 is an explanatory diagram of the exemplary information stored in an analytical case example database according to the third embodiment.

The CMDB 25 is a database similar to the CMDB 15. For example, as illustrated in FIG. 19, in the CMDB 25 are stored the CIs and the relationships between the CIs. In the CMDB 25, it is assumed that the relationships between the physical machine "PM: pm11" and the virtual machine "VM: vb01" remain undefined as was the case with the CMDB 15. In addition, in the CMDB 25, it is also assumed that the relationships between the virtual machine "VM: va02" and the service "Svc: Tc" remain undefined. FIG. 19 is an explanatory diagram for explaining the exemplary information stored in the CMDB according to the third embodiment.

The relationship constraint DB 26 is, in an identical manner to the relationship constraint DB 16 according to the second embodiment, a database for storing predetermined constraint conditions that are used while extracting prospective relationships. For example, the relationship constraint DB 26 stores therein the same data as the relationship constraint DB 16 according to the second embodiment.

The analytical case example DB 28 is used to store, in a corresponding manner, the CIs in which errors have occurred and the CIs that have caused those errors. That is, in the analytical case example DB 28, the error-occurring CIs and the error-causing CIs are stored in a corresponding manner. The information stored in the analytical case example DB 28 is obtained by studying in advance the error-occurring CIs and the error-causing CIs that were treated as management targets in the past.

For example, as illustrated in FIG. 20, in the analytical case example DB 28, the error-occurring CIs and the error-causing CIs are stored in a corresponding manner. FIG. 20 is an explanatory diagram of the exemplary information stored in the analytical case example DB 28.

In the analytical case example DB 28 illustrated in FIG. 20; the error-occurring CIs "PM: pm11", "VM: va01", "VM: vb01", "Svc: Ta", and "Svc: Tb" are stored in a corresponding manner to the error-causing CI "PM: pm11". Similarly, the error-occurring CIs "VM: va02", "Svc: Ta", and "Svc: Tc" are stored in a corresponding manner to the error-causing CI "VM: va02".

Returning to the explanation with reference to FIG. 18, the initial evaluation performing unit 22 executes an application that traces the relationships from the CIs in which an error has occurred and identifies a CI that has caused that error. Then, if the CI that is identified by the application to have caused the error matches with the CI that is stored in the analytical case example DB 28 as the CI that has caused the same error, the initial evaluation performing unit 22 computes a high evaluation for the same.

More particularly, the initial evaluation performing unit 22 obtains the case examples stored in the analytical case example DB 28 and obtains the error-occurring CIs included in the case examples. Then, the initial evaluation performing unit 22 executes an application that, from among the CIs stored in the CMDB 25, traces the relationships from the error-occurring CIs obtained from the analytical case example DB 28 and finds out the respective error-causing CIs.

Thus, from among the CIs stored in the CMDB 25, the application traces the relationships from the error-occurring CIs that are obtained from the analytical case example DB 28 and determines the respective error-causing CIs. Once the error-causing CIs are determined, the initial evaluation performing unit 22 sends the error-causing CIs to the testing unit 24. Besides, the initial evaluation performing unit 22 informs the prospective extracting unit 23 and the testing unit 24 about the case examples obtained from the analytical case example DB 28.

The prospective extracting unit 23 extracts such prospective relationships, between the error-occurring CIs stored in the analytical case example DB 28 and the CIs stored in the CMDB 25, that satisfy predetermined constraint conditions and that are not included in the CMDB 25. More particularly, upon receiving a request regarding prospective relationships from the testing unit 24, the prospective extracting unit 23 obtains the constraints that are used while extracting relationships from the relationship constraint DB 26.

Besides, the prospective extracting unit 23 obtains the error-occurring CIs included in the case examples obtained by the initial evaluation performing unit 22 from the analytical case example DB 28. Then, for each of the obtained error-occurring CIs, the prospective extracting unit 23 first extracts prospective relationships satisfying the obtained constraints and then sends those prospective relationships to the testing unit 24.

Figure 21:
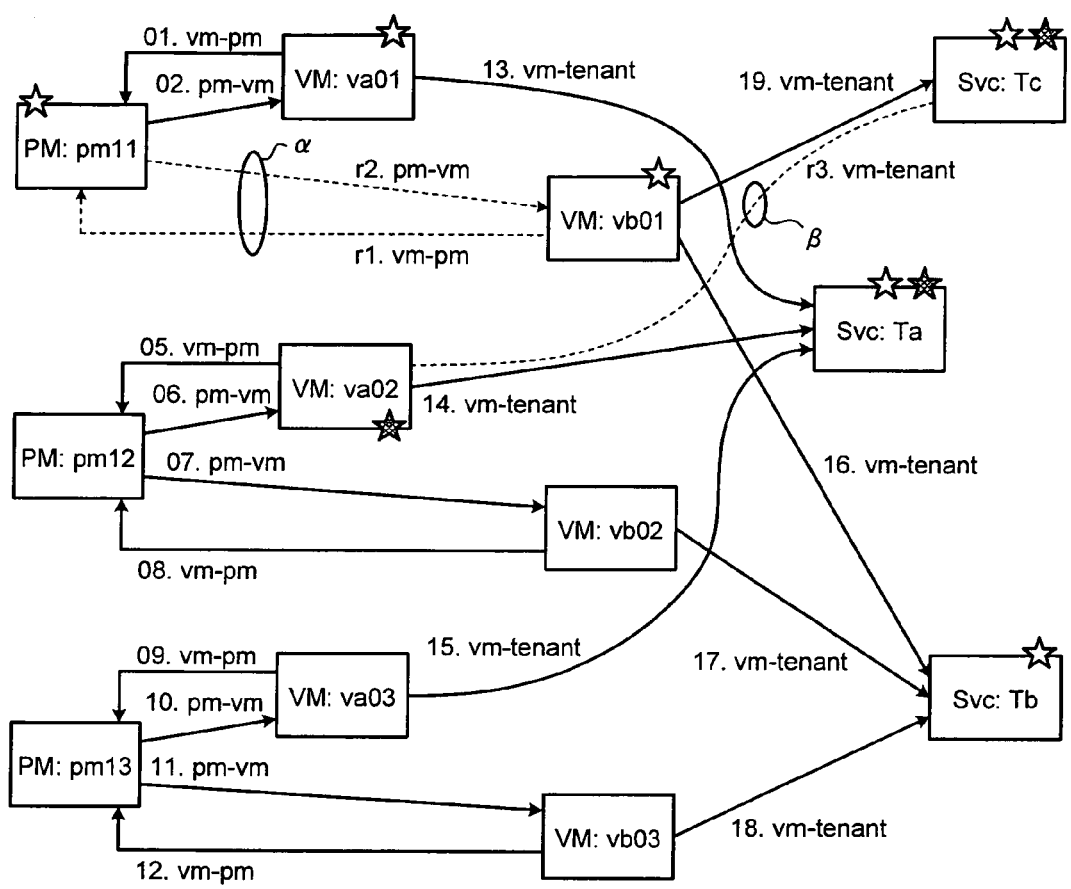
FIG. 21 is an explanatory diagram of exemplary relationships extracted by the supplementing device according to the third embodiment.

FIG. 21 is an explanatory diagram of exemplary relationships extracted by the supplementing device according to the third embodiment. In the example illustrated in FIG. 21, each error-occurring CI included in a first case example is flagged with an open star sign, while each error-occurring CI included in a second case example is flagged with a shaded star sign.

For example, the prospective extracting unit 23 obtains all constraints from the relationship constraint DB 26 and obtains the first case example from the analytical case example DB 28. Then, the prospective extracting unit 23 extracts constraint-satisfying prospective relationships between the error-occurring CI "PM: pm11" included in the first case example and the other CIS stored in the CMDB 25, and extracts constraint-satisfying prospective relationships between the error-occurring CI "VM: va01" included in the first case example and the other CIS stored in the CMDB 25.

Similarly, the prospective extracting unit 23 extracts constraint-satisfying prospective relationships between the error-occurring CI "VM: vb01" and the other CIS stored in the CMDB 25, between the error-occurring CI "Svc: Ta" and the other CIS stored in the CMDB 25, and between the error-occurring CI "Svc: Tb" and the other CIS stored in the CMDB 25.

As a result, upon obtaining the first case example, the prospective extracting unit 23 extracts the relationships "r1. vm-pm" and "r2. pm-vm" as the prospective relationships between the physical machine "PM: pm11" and the virtual machine "VM: vb01" as illustrated by α in FIG. 21. Similarly, upon obtaining the second case example, the prospective extracting unit 23 extracts a relationship "r3. vm-tenant" as the prospective relationship between the virtual machine "VM: va02" and the service "Svc: Tc" as illustrated by β in FIG. 21. Then, the prospective extracting unit 23 sends the prospective relationships "r1. vm-pm", "r2. pm-vm", and "r3. vm-tenant" to the testing unit 24.

Returning to the explanation with reference to FIG. 18, the testing unit 24 executes an application that refers to the extracted prospective relationships and searches for prospective error-causing CIs. Then, the testing unit 24 determines whether the prospective error-causing CIs searched by the application match with the error-causing CIs stored in the analytical case example DB 28. If the prospective error-causing CIs match with the stored error-causing CIs, the testing unit 24 obtains an evaluation result stating that that the extracted prospective relationships are appropriate.

More particularly, the testing unit 24 obtains the error-causing CIs determined by the application executed by the initial evaluation performing unit 22. If those error-causing CIs do not match with the error-causing CIs in the case examples notified by the initial evaluation performing unit 22, then the testing unit 24 issues a request for prospective relationships to the prospective extracting unit 23.

Then, the testing unit 24 obtains the prospective relationships extracted by the prospective extracting unit 23. Subsequently, the testing unit 24 executes an application that refers to the relationships to which the extracted prospective relationships are each applied and searches for the error-causing CIs. If the error-causing CIs determined by the application match with the error-causing CIs included in the case example, then the testing unit 24 assumes that the applied prospective relationships are appropriate and sends them to the comprehensive evaluation performing unit 27.

For example, in the example illustrated in FIG. 21, the testing unit 24 obtains the prospective relationships "r1. vm-pm" and "r2. pm-vm" and, with respect to the relationships to which the obtained prospective relationships are applied, executes the application that searches for the error-causing CIs.

From the error-occurring CIs included in the first case example, the application traces the relationships to which the prospective relationships "r1. vm-pm" and "r2. pm-vm" are applied and searches for the error-causing CIs. When the prospective relationships "r1. vm-pm" and "r2. pm-vm" are applied, the application determines that the physical machine "PM: pm11" is the corresponding error-causing CI.

The physical machine "PM: pm11" determined by the application to be the error-causing CI is also specified as the error-causing CI in the first case example. Hence, the testing unit 24 sends the prospective relationships "r1. vm-pm" and "r2. pm-vm" to the comprehensive evaluation performing unit 27.

Similarly, the testing unit 24 obtains the prospective relationship "r3. vm-tenant" and, with respect to the relationship to which the obtained prospective relationship is applied, executes the application that searches for the error-causing CIs. When the prospective relationship "r3. vm-tenant" is applied, the application determines that the virtual machine "VM: va02" is the corresponding error-causing CI.

The virtual machine "VM: va02" determined by the application to be the error-causing CI is also specified as the error-causing CI in the second case example. Hence, the testing unit 24 sends the prospective relationship "r3. vm-tenant" to the comprehensive evaluation performing unit 27.

Thus, the comprehensive evaluation performing unit 27 obtains the prospective relationships from the testing unit 24. Once the initial evaluation performing unit 22 completes the evaluation of all case examples stored in the analytical case example DB 28, the comprehensive evaluation performing unit 27 creates a prospective-relationship table in which the obtained prospective relationships are specified and sends that prospective-relationship table to the UI unit 21.

Figures 22, 23:
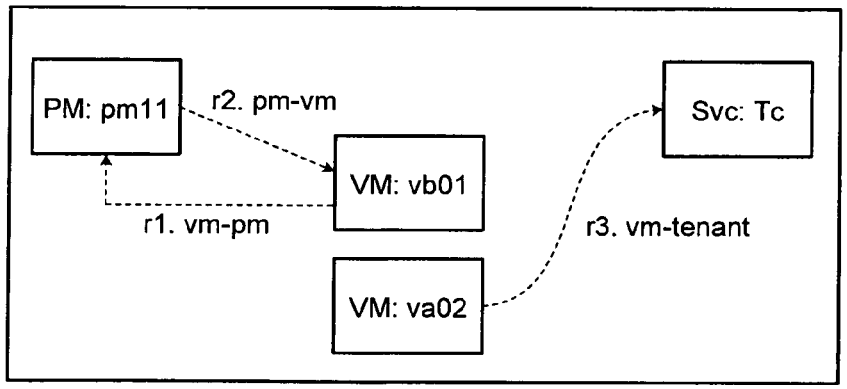
FIG. 22 is an explanatory diagram of a prospective-relationship table according to the third embodiment.
FIG. 23 illustrates an exemplary inquiry display that is displayed to the user by the supplementing device according to the third embodiment.

For example, the comprehensive evaluation performing unit 27 obtains the prospective relationships "r1. vm-pm" and "r2. pm-vm" as well as the prospective relationship "r3. vm-tenant" from the testing unit 24. Then, as illustrated in FIG. 22, the comprehensive evaluation performing unit 27 creates a prospective-relationship table in which the obtained prospective relationships are specified. Thus, FIG. 22 is an explanatory diagram of the prospective-relationship table according to the third embodiment. Subsequently, the comprehensive evaluation performing unit 27 sends that prospective-relationship table to the UI unit 21.

Returning to the explanation with reference to FIG. 18, the UI unit 21 obtains the prospective-relationship table created by the comprehensive evaluation performing unit 27 and displays the same to user. Upon displaying the prospective-relationship table to the user, if the user issues a request for registering particular prospective relationships specified in the prospective-relationship table, then the UI unit 21 registers the requested prospective relationships in the CMDB 25.

FIG. 23 illustrates an exemplary inquiry display that is displayed to the user by the supplementing device according to the third embodiment. As illustrated in FIG. 23, the UI unit 21 displays the prospective-relationship table to the user. If the user issues a registration request of particular prospective relationships specified in the prospective-relationship table, then the UI unit 21 registers the requested prospective relationships in the CMDB 25.

Figure 24:
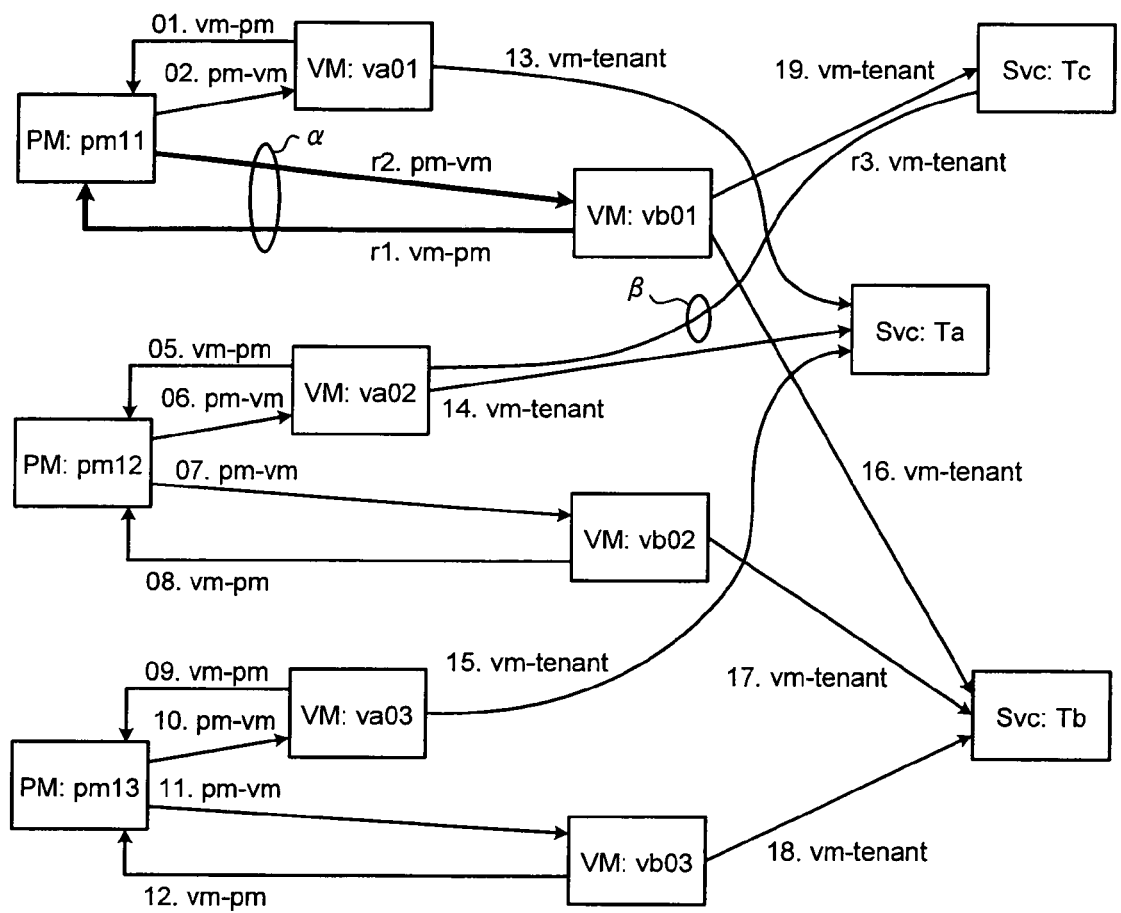
FIG. 24 is an explanatory diagram for explaining an example of a registration operation according to the third embodiment.

Herein, the UI unit 21 registers the prospective relationships "r1. vm-pm" and "r2. pm-vm" in the CMDB 25 as illustrated by α in FIG. 24. Moreover, the UI unit 21 registers the prospective relationship "r3. vm-tenant" in the CMDB 25 as illustrated by β in FIG. 24. FIG. 24 is an explanatory diagram for explaining an example of the registration operation according to the third embodiment.

Meanwhile, the UI unit 21, the initial evaluation performing unit 22, the prospective extracting unit 23, the testing unit 14, and the comprehensive evaluation performing unit 27 are, for example, electronic circuits. As an exemplary electronic circuit, it is possible to use an integrated circuit such as an ASIC or an FPGA, or use a CPU or a MPU.

The CMDB 25 as well as the relationship constraint DB 26 is a RAM, a ROM, or a semiconductor memory element such as a flash memory, or is a memory device such as a hard disk or an optical disk. Similarly, the analytical case example DB 28 is also a RAM, a ROM, or a semiconductor memory element such as a flash memory, or is a memory device such as a hard disk or an optical disk.

Operations Performed by Supplementing Device

Figure 25:
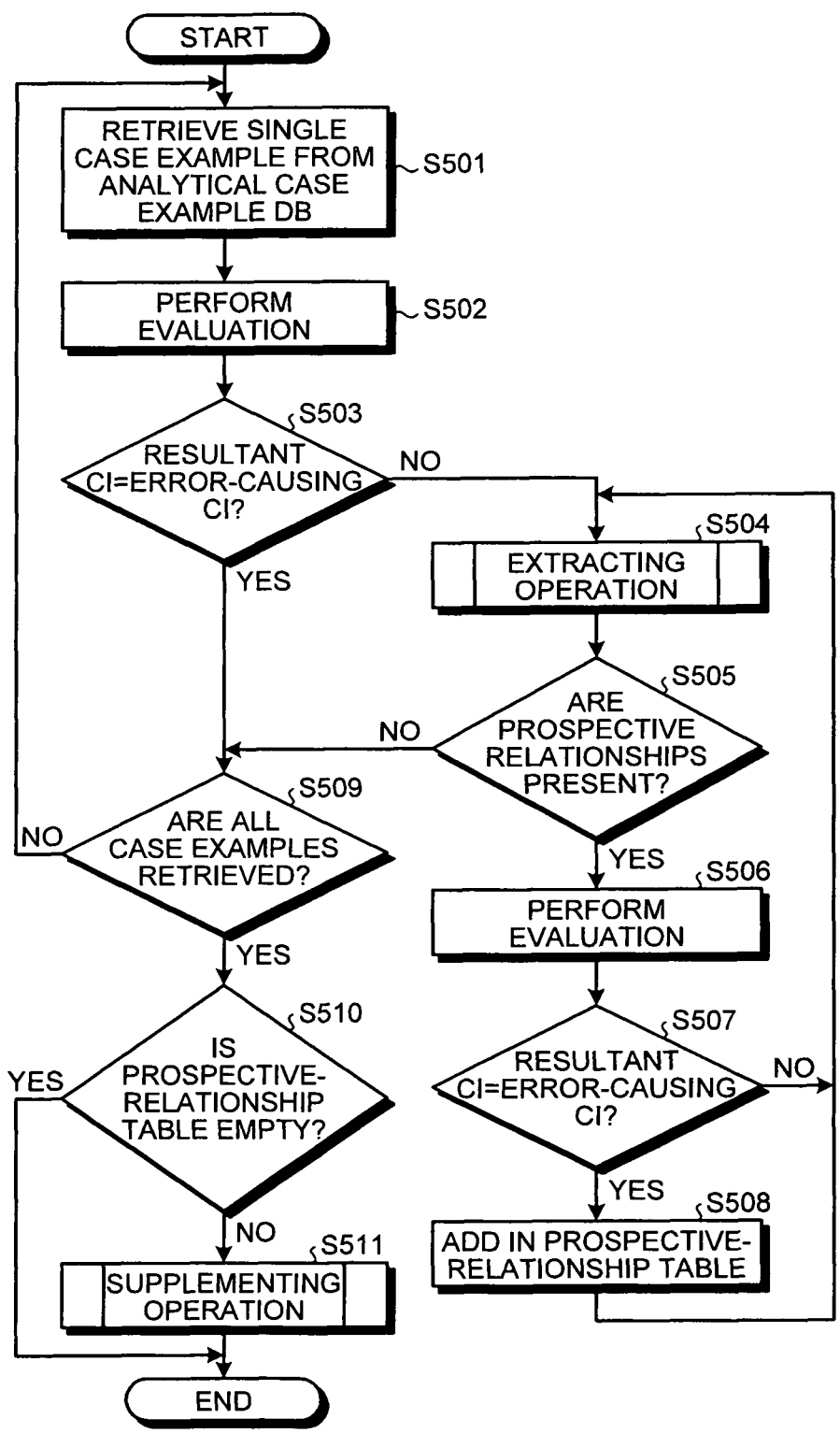
FIG. 25 is a flowchart for explaining the sequence of operations performed by the supplementing device according to the third embodiment.

Explained below with reference to FIG. 25 is the sequence of operations performed by the supplementing device 20. FIG. 25 is a flowchart for explaining the sequence of operations performed by the supplementing device according to the third embodiment. For example, the supplementing device 20 starts the operations as soon as the power is turned ON.

Firstly, the supplementing device 20 retrieves a case example from the analytical case example DB 28 (Step S501). Then, the supplementing device 20 evaluates the CMDB 25 by referring to the error-occurring CIs in the retrieved case example (Step S502) and searches for the error-causing CIs. Subsequently, the supplementing device 20 determines whether the error-causing CIs determined during the search match with the error-causing CIs included in the retrieved case example (Step S503).

If the error-causing CIs determined during the search do not match with the error-causing CIs included in the retrieved case example (No at Step S503), then the supplementing device 20 performs the extracting operation for extracting prospective relationships from the error-occurring CIs included in the case example (Step S504). If extraction of the prospective relationships is successful (Yes at Step S505), then the supplementing device 20 evaluates the relationships in the CMDB 25 to which the extracted prospective relationships are applied (Step S506). That is, the supplementing device 20 executes the application for searching for the error-causing CIs and, based on the execution result of the application, evaluates the relationships in the CMDB 25 to which the extracted prospective relationships are applied.

Subsequently, the supplementing device 20 determines whether the error-causing CIs determined during the search match with the error-causing CIs included in the retrieved case example (Step S507). If the error-causing CIs determined during the search match with the error-causing CIs included in the retrieved case example (Yes at Step S507), then the supplementing device 20 adds the extracted prospective relationships in the prospective-relationship table (Step S508).

On the other hand, if the error-causing CIs determined during the search do not match with the error-causing CIs included in the retrieved case example (No at Step S507), then the supplementing device 20 performs the extracting operation with respect to the remaining CIs included in the case example (Step S504).

Meanwhile, if the error-causing CIs determined by the initial evaluation performing unit 22 match with the error-causing CIs included in the retrieved case example (Yes at Step S503), then the supplementing device 20 determines whether all case examples have been retrieved from the analytical case example DB 28 (Step S509). If all case examples have been retrieved from the analytical case example DB 28 (Yes at Step S509), then the supplementing device 20 determines whether the prospective-relationship table is empty without having any prospective relationships registered therein (Step S510).

If the prospective-relationship table is determined to have prospective relationships registered therein (No at Step S510), then the supplementing device 20 performs the supplementing operation (Step S511) and ends the operations. Meanwhile, if extraction of the prospective relationships is not successful (No at Step S505), then the supplementing device 20 determines whether all case examples have been retrieved from the analytical case example DB 28 (Step S509).

Moreover, if the prospective-relationship table is determined to be empty (Yes at Step S510), the supplementing device 20 ends the operations without performing the supplementing operation. Furthermore, if all case examples are yet to be retrieved from the analytical case example DB 28 (No at Step S509), then the supplementing device 20 retrieves a case example from among the unevaluated case examples stored in the analytical case example DB 28 (Step S501).

Effect of Third Embodiment

As described above, the supplementing device 20 according to the third embodiment refers to the relationships to which the extracted prospective relationships are applied and searches for the error-causing CIs from the error-occurring CIs. When the error-causing CIs found during the search match with the error-causing CIs included in the case examples, the supplementing device 20 performs the supplementing operation with the prospective relationships that have been applied.

Hence, without having to perform the calculation of the initial grades and without having to perform the origin determining operation, the supplementing device 20 is able to evaluate the extracted relationships and accordingly supplement the undefined relationships. Moreover, by storing a number of case examples in the analytical case example DB 28, the supplementing device 20 can supplement the undefined relationships with more precision. Besides, by storing a number of case examples in the analytical case example DB 28, the supplementing device 20 can supplement the appropriate undefined relationships and can build the information stored in the CMDB 25 in a stepwise manner.

[d] Fourth Embodiment

Although the present invention has been described with reference to the abovementioned embodiments, it is also possible to implement the invention in various forms other than the abovementioned embodiments. In the following description, other embodiments of the present invention are described under a fourth embodiment.

(1) Regarding Evaluation Method

In the second embodiment, when an error-causing CI is also determined to the origin of that error, the supplementing device 10 registers the prospective relationships that have been applied. Similarly, in the third embodiment, when the error-causing CIs determined during the search match with the error-causing CIs included in case examples, the supplementing device 20 registers the prospective relationships that have been applied.

However, apart from the abovementioned methods, other methods can also be implemented for registering the prospective relationships that have been applied. For example, regarding case examples stored in an analytical case example DB, a supplementing device applies prospective relationships and searches for error-causing CIs.

Then, the supplementing device assigns, to the prospective relationships that have been applied, the multiplicative inverse of the number of CIs determined to cause the errors during the search. Subsequently, the supplementing device adds the grades to the applied prospective relationships and displays to the user or registers the prospective relationships in order of priority of the count.

Meanwhile, in the second embodiment, the supplementing device 10 determines whether an error-occurring CI is also the origin of that error. However, that need not be the only possible case. Alternatively, any other method can be implemented that, without determining the origin of an error, can determine whether prospective relationships are appropriate.

(2) Regarding Analysis Application

In the supplementing devices according to the abovementioned embodiments, in order to evaluate the relationships stored in a CMDB and to evaluate the extracted prospective relationships, an application is executed that searches for the cause of an error by tracing the relationships. However, alternatively, it is also possible to execute an application that, for example, geometrically evaluates the consistency of the CMDB from the number of CIs and relationships stored in the CMDB. Still alternatively, the supplementing device can execute any other application that can evaluate the consistency of the CMDB.

(3) Regarding Constraints

In the abovementioned embodiments, the type constraints, the number constraints, the state transition constraints, and the inter-relationship constraints are set as the constraints used while extracting prospective relationships. However, that need not be the only possible cases. That is, as an example of the type constraints, it is also possible to set a relationship "vm-tenant" between a virtual machine and a service. Still alternatively, any other constraint can be used that makes it possible to extract prospective relationships that precisely represent the relationships between CIs.

(4) Program

Figure 26:
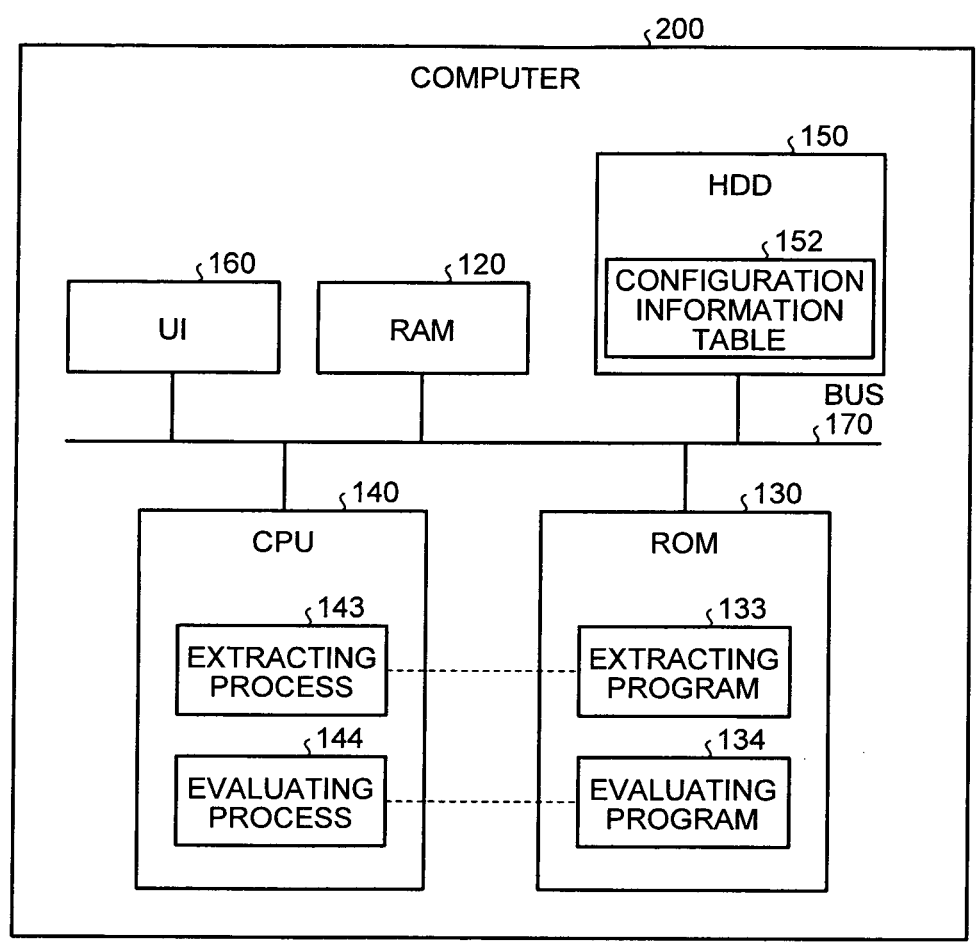
FIG. 26 is a block diagram of a computer that executes a management program.
Figure 27:
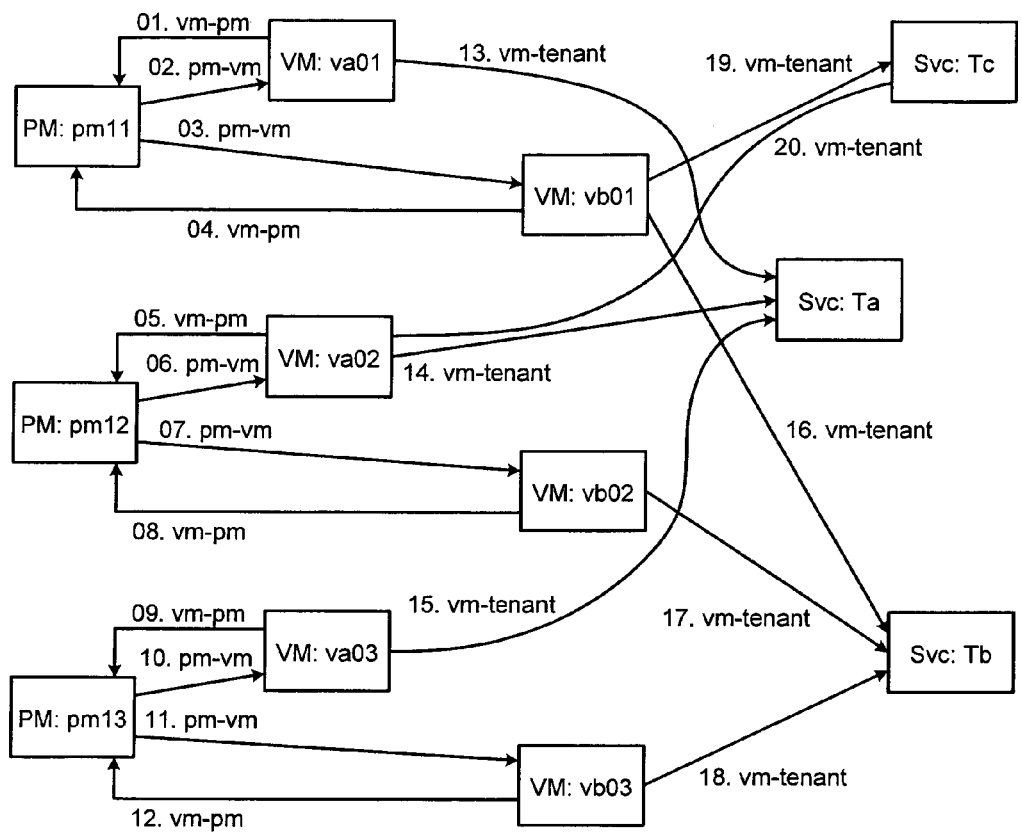
FIG. 27 is an explanatory diagram for explaining a CMDB.
Figure 28:
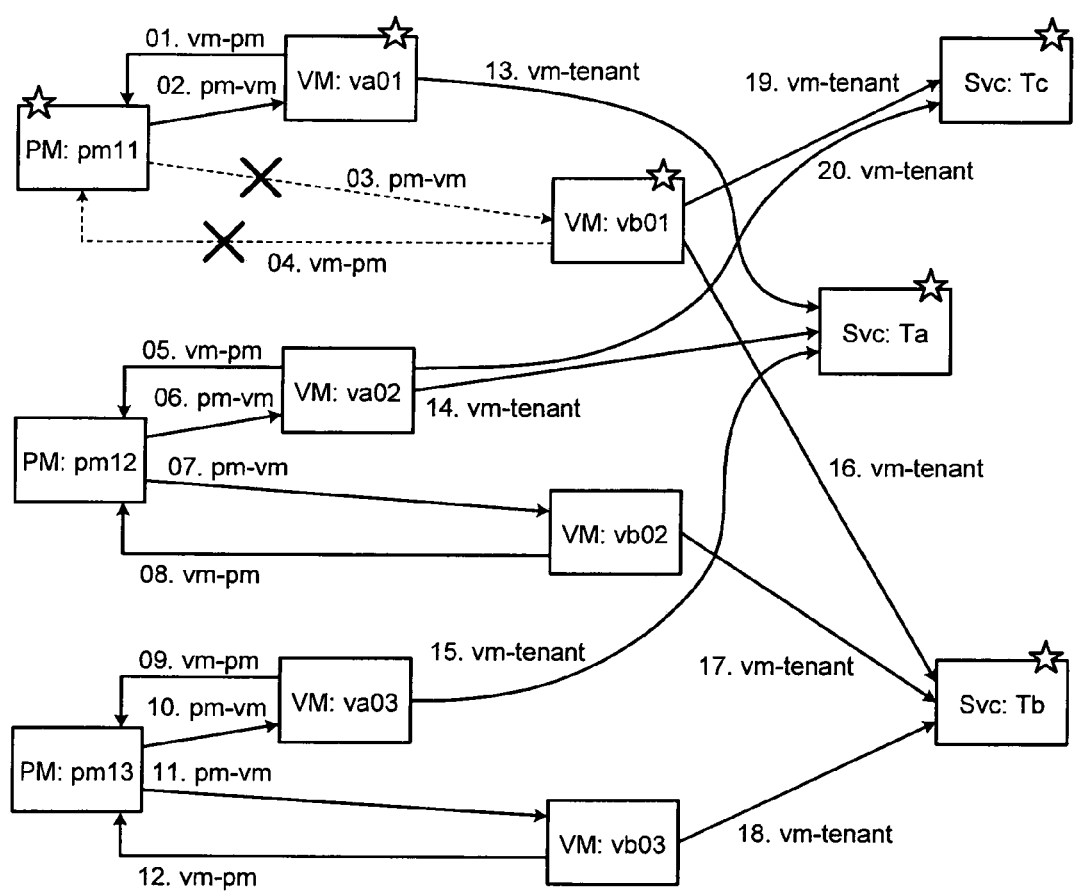
FIG. 28 is an explanatory diagram for explaining about undefined relationships in the CMDB illustrated in FIG. 27.

Regarding the supplementing device according to the first embodiment, or regarding the supplementing device according to the second embodiment or the third embodiment, the explanation is given for the case of performing various operations with the use of hardware. Alternatively, the same operations can also be performed by executing a pre-written program in a computer of the management device or the supplementing device. Explained below with reference to FIG. 26 is an exemplary computer that executes a program having identical functions to those of the management device according to the first embodiment. FIG. 26 is a block diagram of a computer that executes a management program.

As illustrated in FIG. 26, a computer 200 includes a RAM 120, a ROM 130, and a hard disk drive (HDD) 150 that are interconnected by a bus 170. Besides, in the computer 200 illustrated in FIG. 26, a CPU 140 is also connected to the bus 170. Moreover, a UI 160 for displaying the prospective relationships to the user is also connected to the bus 170.

In the HDD 150 is stored in advance a configuration information table 152, which is used to store the information identical to that stored in the memory unit 2 according to the first embodiment. In the ROM 130 are stored in advance an extracting program 133 and an evaluating program 134. In the example illustrated in FIG. 26, when the CPU 140 reads the extracting program 133 and the evaluating program 134 from the ROM 130 and executes the same, the extracting program 133 and the evaluating program 134 function as an extracting process 143 and an evaluating process 144, respectively. The extracting process 143 and the evaluating process 144 implement the functions identical to those implemented by the extracting unit 3 and the evaluating unit 4, respectively, illustrated in FIG. 1. Meanwhile, the extracting process 143 and the evaluating process 144 can also be configured to implement the functions identical to those implemented by the constituent elements according to the second embodiment or according to the third embodiment.

Meanwhile, the abovementioned management program can be implemented by executing, in a computer such as a personal computer or a workstation, a program written in advance. Moreover, that program can be distributed via a network such as Internet. Alternatively, it is possible to store that program in a computer-readable recording medium such as flexible disk (FD), a compact disk read only memory (CD-ROM), a magneto optical (MO) disk, or a digital versatile disk (DVD). A computer can then read that stored program from the recording medium and execute the same.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management device comprising:
a memory; and
a processor coupled to the memory, wherein the processor executes a process comprising:
storing in a memory unit of the memory, configuration item information regarding configuration items which are managed and relationship information regarding first relationships between the configuration items which are managed;
extracting, based on the information stored in the memory unit and based on predetermined constraint conditions that include first conditions for a type and a number of one configuration item that has to be related to another configuration item with a certain type, second relationships that are between one configuration item that does not satisfy the type and the number of the first conditions and another configuration item which is corresponding to the type of the first conditions and that are not included in the relationship information;
evaluating by executing an application that refers to the second relationships and obtaining an evaluation result regarding the second relationships;
making links between the one configuration item that does not satisfy the type and the number of the first conditions and each of configuration items positioned upstream of the one configuration item that does not satisfy the type and the number of the first conditions, respectively;
specifying, in each of the links, an error-origin configuration item in which an error has occurred, the error having occurred in configuration items positioned one step-downstream of the error-origin configuration item, the error not having occurred in configuration items positioned one step-upstream of the error-origin configuration item;

specifying a link that has one error-origin configuration item out of the links; and making a grade about the second relationship corresponding to the specified link.

2. The management device according to claim 1, further comprising additionally registering, according to the grade made, the second relationship in the memory unit.

3. The management device according to claim 1, further comprising storing in an analytical case example memory unit of the memory, in a corresponding manner, configuration item information regarding configuration items in which an error has occurred and configuration item information regarding configuration items that have caused the error, wherein each of the second relationships is a relationship between one configuration item in which the error has occurred and stored in the analytical case example memory unit and another configuration item stored in the memory unit, and determining at the evaluating whether configuration item information regarding the error-causing configuration item corresponding to the specified link matches with the configuration item information regarding configuration items in which the error has occurred stored in the analytical case example memory unit, and, when there is a match, making the grade about the second relationship corresponding to the specified link.

4. The management device according to claim 1, wherein the predetermined constraint conditions include a condition for a state of one configuration item that has to be related to another configuration item with a certain type or a condition depending on relationship information stored in the memory unit.

5. A management method comprising:

extracting, based on information stored in a memory unit that includes configuration item information regarding configuration items which are managed and relationship information regarding first relationships between the configuration items which are managed and based on predetermined constraint conditions that include first conditions for a type and a number of one configuration item that has to be related to another configuration item with a certain type, second relationships that are between one configuration item that does not satisfy the type and the number of the first conditions and another configuration item which is corresponding to the type of the first conditions and that are not included in the relationship information;

evaluating that includes executing an application that refers to the second relationships and obtaining an evaluation result regarding the second relationships;

making links between the one configuration item that does not satisfy the type and the number of the first conditions and each of configuration items positioned upstream of the one configuration item that does not satisfy the type and the number of the first conditions, respectively;

specifying, in each of the links, an error-origin configuration item in which an error has occurred, the error having occurred in configuration items positioned one step-downstream of the error-origin configuration item, the error not having occurred in configuration items positioned one step-upstream of the error-origin configuration item;

specifying a link that has one error-origin configuration item out of the links; and making a grade about the second relationship corresponding to the specified link.

6. A non-transitory computer readable recording medium having stored therein a management program which causes a computer to execute a process comprising:

extracting, based on information stored in a memory unit that includes configuration item information regarding configuration items which are managed and relationship information regarding first relationships between the configuration items which are managed and based on predetermined constraint conditions that include first conditions for a type and a number of one configuration item that has to be related to another configuration item with a certain type, second relationships between that are one configuration item that does not satisfy the type and the number of the first conditions and another configuration item which is corresponding to the type of the first conditions and that are not included in the relationship information;

evaluating that includes executing an application that refers to the second relationships and obtaining an evaluation result regarding the second relationships;

making links between the one configuration item that does not satisfy the type and the number of the first conditions and each of configuration items positioned upstream of the one configuration item that does not satisfy the type and the number of the first conditions, respectively;

specifying, in each of the links, an error-origin configuration item in which an error has occurred, the error having occurred in configuration items positioned one step-downstream of the error-origin configuration item, the error not having occurred in configuration items positioned one step-upstream of the error-origin configuration item;

specifying a link that has one error-origin configuration item out of the links; and making a grade about the second relationship corresponding to the specified link.

* * * * *

UNITED STATES PATENT AND TRADEMARK OFFICE
CERTIFICATE OF CORRECTION

| | |
|---|---|
| PATENT NO. | : 8,838,639 B2 |
| APPLICATION NO. | : 12/926978 |
| DATED | : September 16, 2014 |
| INVENTOR(S) | : Atsuji Sekiguchi et al. |

It is certified that error appears in the above-identified patent and that said Letters Patent is hereby corrected as shown below:

On the Title Page

First Page, Column 2 (Other Publications), Lines 1-2, Below "OTHER PUBLICATIONS" delete "Japanese Office Action, Mailed Sep. 10, 2013; In correspondence to Japanese Patent Application No. 2009-298818".

Signed and Sealed this
Sixth Day of January, 2015

Michelle K. Lee
*Deputy Director of the United States Patent and Trademark Office*